(12) United States Patent
Fan et al.

(10) Patent No.: US 11,907,604 B2
(45) Date of Patent: Feb. 20, 2024

(54) SCREEN MIRRORING DISPLAY METHOD USING LAYER ORDERS OF TARGET CONTROLS AND ELECTRONIC DEVICE

(71) Applicant: Huawei Technologies Co., Ltd., Shenzhen (CN)

(72) Inventors: Zhenhua Fan, Nanjing (CN); Yuan Cao, Nanjiing (CN); Sucheng Bian, Nanjing (CN); Wanyi Yang, Nanjing (CN); Pengcheng Li, Shenzhen (CN); Xi Wei, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 122 days.

(21) Appl. No.: 17/616,833

(22) PCT Filed: Jun. 2, 2020

(86) PCT No.: PCT/CN2020/093872
§ 371 (c)(1),
(2) Date: Dec. 6, 2021

(87) PCT Pub. No.: WO2020/244492
PCT Pub. Date: Dec. 10, 2020

(65) Prior Publication Data
US 2022/0308823 A1     Sep. 29, 2022

(30) Foreign Application Priority Data

Jun. 5, 2019 (CN) .......................... 201910487807.5

(51) Int. Cl.
*G06F 3/14* (2006.01)
*G06F 9/451* (2018.01)
(Continued)

(52) U.S. Cl.
CPC .......... *G06F 3/1454* (2013.01); *G06F 3/0481* (2013.01); *G06F 9/451* (2018.02); *H04M 1/724095* (2022.02)

(58) Field of Classification Search
CPC .... G06F 3/0481; G06F 3/1438; G06F 3/1454; G06F 9/451; G06F 13/00; G06F 9/453;
(Continued)

(56) References Cited

U.S. PATENT DOCUMENTS 6,075,531 A      6/2000  Destefano
2004/0169654 A1* 9/2004  Walker ................. G06T 11/206
                                                 345/440

(Continued)

FOREIGN PATENT DOCUMENTS

CN        101488072 A        7/2009
CN        101692196 A        4/2010
(Continued)

*Primary Examiner* — Richard J Hong
(74) *Attorney, Agent, or Firm* — Conley Rose, P.C.

(57) ABSTRACT

A screen mirroring display method includes a destination device receiving a first message from a first source device and a second message from a second source device, where the first message includes a first drawing instruction. The first drawing instruction instructs the destination device to draw a first target control in a first interface displayed by the first source device. The second message includes a second drawing instruction. The second drawing instruction instructs the destination device to draw a second target control in a second interface displayed by the second source device. Then the destination device draws a screen mirroring interface according to the first drawing instruction and the second drawing instruction, where the screen mirroring interface includes the first target control and the second target control.

20 Claims, 17 Drawing Sheets

(51) Int. Cl.
*H04M 1/72409* (2021.01)
*G06F 3/0481* (2022.01)

(58) Field of Classification Search
CPC .............. G06F 16/9027; G06F 40/137; G09G 2340/14; G09G 2370/20; H04M 1/724095; H04M 1/72412; H04L 51/02; H04L 67/025; H04L 67/54; H04L 63/0457; G06T 11/206; G06Q 10/10
See application file for complete search history.

(56) References Cited

U.S. PATENT DOCUMENTS

| | | | |
|---|---|---|---|
| 2004/0261037 A1 | 12/2004 | Ording et al. | |
| 2009/0217177 A1* | 8/2009 | DeGrazia | G06Q 10/10 715/753 |
| 2012/0303452 A1* | 11/2012 | Xue | H04L 51/02 705/14.49 |
| 2013/0091205 A1* | 4/2013 | Kotler | H04L 67/54 709/204 |
| 2013/0227014 A1 | 8/2013 | Song | |
| 2013/0246936 A1* | 9/2013 | Nancke-Krogh | G06F 3/0481 715/750 |
| 2014/0240445 A1 | 8/2014 | Jaynes | |
| 2015/0268919 A1* | 9/2015 | Zhang | G06F 3/1454 345/1.2 |
| 2017/0235435 A1* | 8/2017 | Sohn | G06F 3/0481 715/738 |
| 2017/0244779 A1* | 8/2017 | Reichling | H04L 67/025 |
| 2017/0329417 A1* | 11/2017 | Izumi | G06F 13/00 |
| 2018/0004715 A1* | 1/2018 | Street | G06F 40/137 |
| 2018/0053003 A1* | 2/2018 | Nair | H04L 63/0457 |
| 2018/0341627 A1* | 11/2018 | Moldovean | G06F 16/9027 |
| 2019/0011997 A1* | 1/2019 | Wisnia | G06F 9/453 |

FOREIGN PATENT DOCUMENTS

| | | |
|---|---|---|
| CN | 106203160 A | 12/2016 |
| CN | 106528025 A | 3/2017 |
| CN | 106774875 A | 5/2017 |
| CN | 108124173 A | 6/2018 |
| CN | 108366062 A | 8/2018 |
| CN | 108874341 A | 11/2018 |
| CN | 109032722 A | 12/2018 |
| CN | 109445733 A | 3/2019 |
| CN | 109508162 A | 3/2019 |
| CN | 110389736 A | 10/2019 |

* cited by examiner

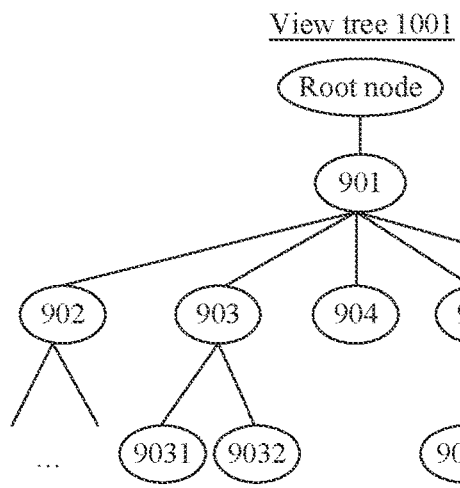
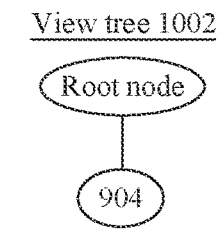
FIG. 10(a)　　　　　　　　　　　　　　FIG. 10(b)
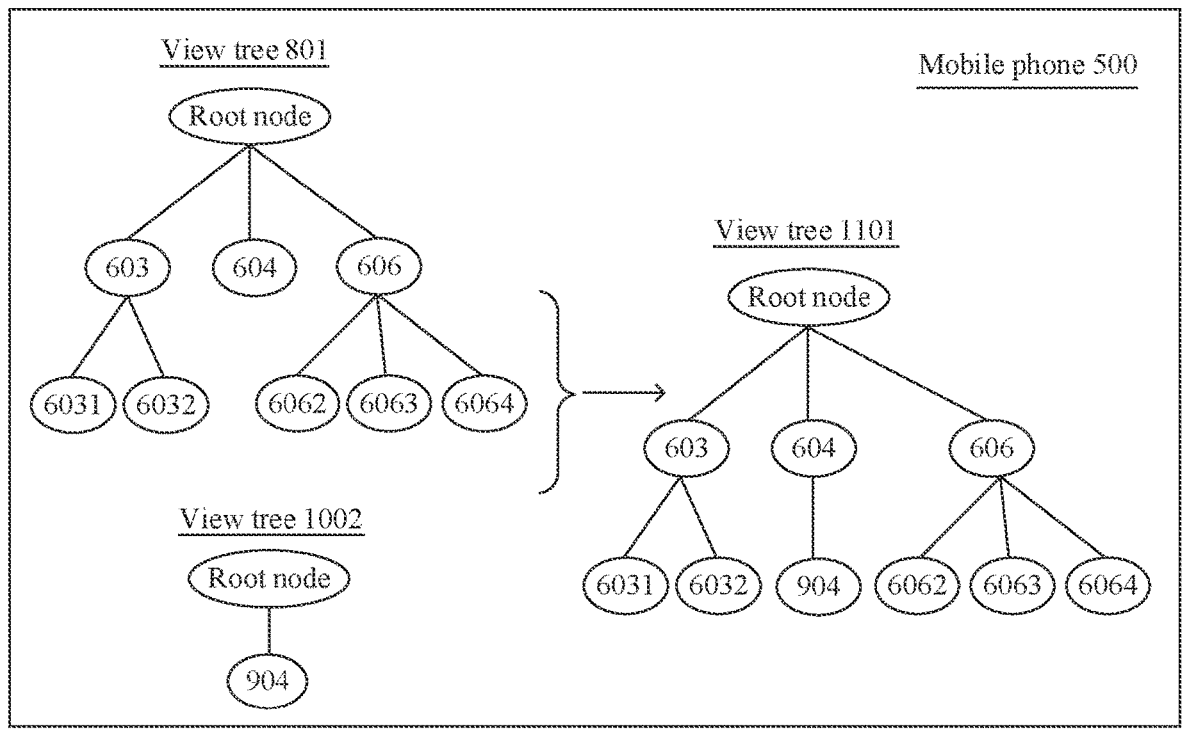
FIG. 11

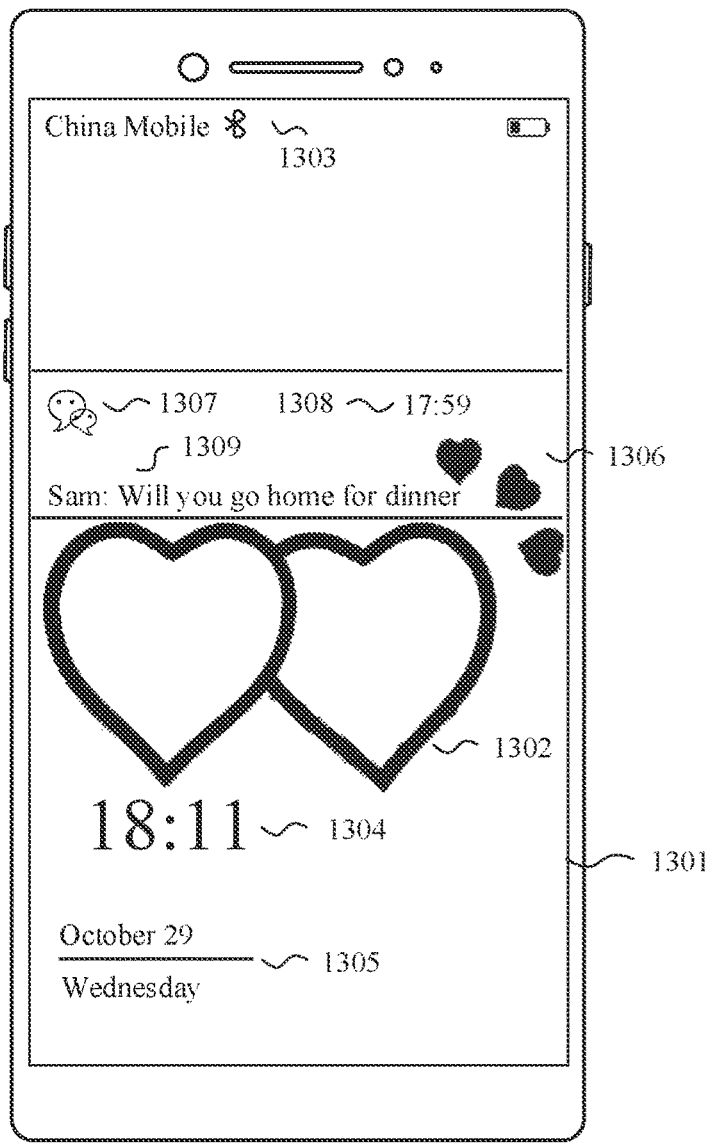
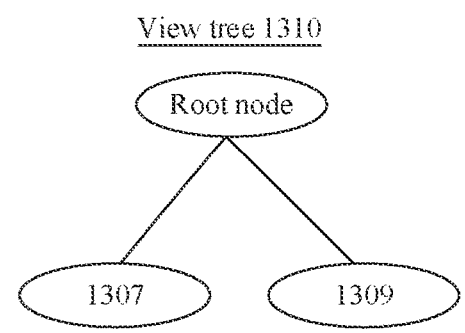
FIG. 13(a)
FIG. 13(b)

SCREEN MIRRORING DISPLAY METHOD USING LAYER ORDERS OF TARGET CONTROLS AND ELECTRONIC DEVICE

CROSS-REFERENCE TO RELATED APPLICATIONS

This application is a continuation of International Patent Application No. PCT/CN2020/093872 filed on Jun. 2, 2020, which claims priority to Chinese Patent Application No. 201910487807.5 filed on Jun. 5, 2019. Both of the aforementioned applications are hereby incorporated by reference in their entireties.

TECHNICAL FIELD

This application relates to the field of terminal technologies, and in particular, to a screen mirroring display method and an electronic device.

BACKGROUND

With development of a smart household technology, one user or family often has a plurality of electronic devices that can communicate with each other. Various electronic devices generally have respective device characteristics. For example, a mobile phone is more portable, a television screen has a better display effect, and sound quality of a sound box is better. To give full play to device characteristics of different electronic devices, the electronic device can implement switching and display of display content between a plurality of devices through screen mirroring or the like.

For example, a user may send, for display, display content in a mobile phone (namely, a source device) to another destination device that supports a screen mirroring function. As the user owns more electronic devices, if the user needs to perform screen mirroring on display content in different source devices to the destination device, the user needs to frequently perform switching between the source devices for screen mirroring.

For example, when using a mobile phone, a user may project a display interface of the mobile phone onto a smart television for display. Subsequently, if the user wants to view display content in a tablet computer, the user may disconnect the mobile phone from the smart television, and set the tablet computer as a new source device. Further, the user may project a display interface of the tablet computer onto the smart television for display, and the display interface of the mobile phone is no longer displayed. Clearly, this method for performing switching between a plurality of source devices for screen mirroring is relatively cumbersome, and user experience is low.

SUMMARY

This application provides a screen mirroring display method and an electronic device. A destination device can simultaneously display content in a plurality of source devices, so that a display effect and user experience of screen mirroring display between a plurality of devices are improved.

To achieve the foregoing objective, the following technical solutions are used in this application.

According to a first aspect, this application provides a screen mirroring display method, including: A destination device receives a first message sent by a first source device, where the first message includes a first drawing instruction, the first drawing instruction is used to draw one or more first target controls, and the first target control is a control in a first interface displayed by the first source device. In addition, the destination device may further receive a second message sent by a second source device, where the second message includes a second drawing instruction, the second drawing instruction is used to draw one or more second target controls, and the second target control is a control in a second interface displayed by the second source device. Further, the destination device may draw a screen mirroring interface according to the first drawing instruction and the second drawing instruction, where the drawn screen mirroring interface includes the first target control and the second target control.

In other words, in a screen mirroring scenario, the destination device displays, in the screen mirroring interface, both the first target control on which the first source device needs to perform screen mirroring and the second target control on which the second source device needs to perform screen mirroring, so that a user can view, in one destination device, display content in a plurality of source devices without performing switching between the plurality of source devices, thereby improving a display effect and user experience of screen mirroring display between a plurality of devices.

In a possible implementation, the first message may further include first view information (for example, a first view tree), and the first view information includes a layer order of the first target controls in the screen mirroring interface. Similarly, the second message may further include second view information (for example, a second view tree), and the second view information includes a layer order of the second target controls in the screen mirroring interface. In this case, that the destination device draws a screen mirroring interface according to the first drawing instruction and the second drawing instruction specifically includes: The destination device may generate third view information based on the first view information and the second view information, where the third view information includes the layer orders of the first target controls and the second target controls in the screen mirroring interface. In this way, the destination device can correspondingly execute the first drawing instruction and the second drawing instruction based on a layer order of controls in the third view information, to draw the screen mirroring interface.

In a possible implementation, before the destination device executes the drawing instruction of the first target control and the drawing instruction of the second target control to draw the screen mirroring interface, the method further includes: The destination device may obtain a configuration file corresponding to both the first interface and the second interface, where the configuration file not only records a first display location of the first target control in the screen mirroring interface, but also records a second display location of the second target control in the screen mirroring interface. In this case, that the destination device generates third view information based on the first view information and the second view information specifically includes: The destination device splits and recombines controls in the first view information and the second view information based on the obtained configuration file, to obtain the third view information.

Alternatively, before the destination device executes the first drawing instruction and the second drawing instruction to draw the screen mirroring interface, the method further includes: The destination device obtains a first configuration file corresponding to the first interface, where the first configuration file records a first display location of the first target control in the screen mirroring interface. In addition, the destination device obtains a second configuration file corresponding to the second interface, where the second configuration file records a second display location of the second target control in the screen mirroring interface. In this case, that the destination device generates third view information based on the first view information and the second view information specifically includes: The destination device may split and recombine controls in the first view information and the second view information based on the first configuration file and the second configuration file, to obtain the third view information.

In a possible implementation, because the configuration file records the first display location of the first target control in the screen mirroring interface and the second display location of the second target control in the screen mirroring interface, that the destination device executes the first drawing instruction and the second drawing instruction based on the third view information, to draw the screen mirroring interface specifically includes: The destination device executes the first drawing instruction at the first display location based on the layer order of the first target controls in the third view information, to draw the first target controls. In addition, the destination device executes the second drawing instruction at the second display location based on the layer order of the second target controls in the third view information, to draw the second target controls.

In a possible implementation, display locations of the first target control in the first interface and the screen mirroring interface are the same or different; and display locations of the second target control in the second interface and the screen mirroring interface are the same or different.

In a possible implementation, before the destination device receives the first message sent by the first source device, the method further includes: The destination device displays a third interface. In this case, the screen mirroring interface drawn by the destination device after screen mirroring may further include one or more third target controls in the third interface. In other words, in a screen mirroring process, the destination device can simultaneously display content in a plurality of source devices and display content in the destination device, so that the user can view, in one device, display content in a plurality of devices.

According to a second aspect, this application provides a screen mirroring display method, including: A source device displays a first display interface. The source device may receive a screen mirroring instruction for projecting the first display interface onto a destination device by a user. In response to the screen mirroring instruction, the source device determines one or more first target controls on which screen mirroring to the destination device needs to be performed in the first display interface. Further, the source device may send a first message to the destination device, where the first message includes a first drawing instruction of the first target control, so that the destination device can draw the first target control in a screen mirroring interface according to the first drawing instruction.

According to a third aspect, this application provides an electronic device, and the electronic device may be the foregoing source device or the foregoing destination device. The electronic device includes a touchscreen, a communication module, one or more processors, one or more memories, and one or more computer programs. The processor is coupled to the communication module, the touchscreen, and the memory, the one or more computer programs are stored in the memory, and when the electronic device runs, the processor executes the one or more computer programs stored in the memory, so that the electronic device performs the screen mirroring display method according to any one of the foregoing.

According to a fourth aspect, this application provides a computer storage medium, including computer instructions. When the computer instructions run on an electronic device, the electronic device performs the screen mirroring display method according to any implementation of the first aspect.

According to a fifth aspect, this application provides a computer program product. When the computer program product runs on an electronic device, the electronic device performs the screen mirroring display method according to any implementation of the first aspect.

It may be understood that the electronic device in the third aspect, the computer storage medium in the fourth aspect, and the computer program product in the fifth aspect that are provided above are all configured to perform the corresponding methods provided above. Therefore, for beneficial effects that can be achieved by the electronic device, the computer storage medium, and the computer program product, refer to beneficial effects in the corresponding methods provided above. Details are not described herein again.

BRIEF DESCRIPTION OF DRAWINGS

FIG. 10(a) and FIG. 10(b) are a schematic diagram 7 of an application scenario of a screen mirroring display method according to an embodiment of this application;

FIG. 11 is a schematic diagram 8 of an application scenario of a screen mirroring display method according to an embodiment of this application;

FIG. 13(a) and FIG. 13(b) are a schematic diagram 10 of an application scenario of a screen mirroring display method according to an embodiment of this application;

DESCRIPTION OF EMBODIMENTS

The following describes implementations of the embodiments in detail with reference to accompanying drawings.

Figure 1:
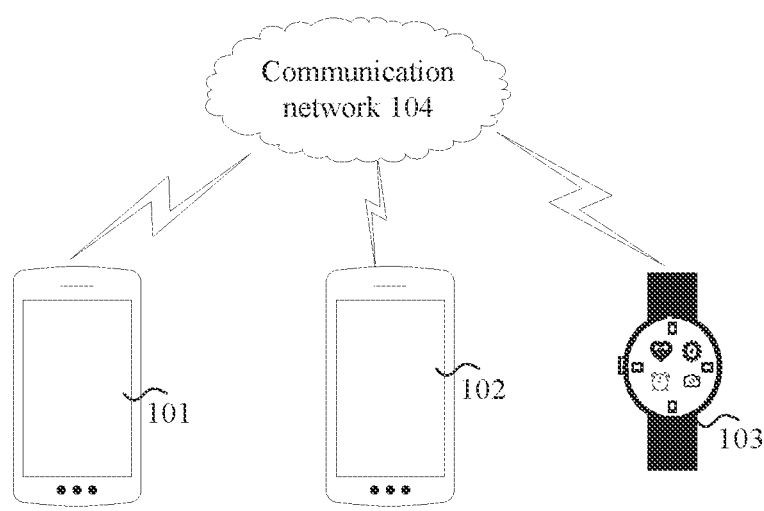
FIG. 1 is a schematic architectural diagram of a communication system according to an embodiment of this application.

As shown in FIG. 1, a screen mirroring display method provided in the embodiments of this application may be applied to a communication system 100, and the communication system 100 may include N (N>1) electronic devices. For example, the communication system 100 may include an electronic device 101 and an electronic device 102.

For example, the electronic device 101 may be connected to the electronic device 102 through one or more communication networks 104.

The communication network 104 may be a wired network, or may be a wireless network. For example, the communication network 104 may be a local area network (local area network, LAN), or may be a wide area network (wide area network, WAN) such as the Internet. The communication network 104 may be implemented by using any known network communication protocol. The network communication protocol may be various wired or wireless communication protocols, for example, Ethernet, a universal serial bus (universal serial bus, USB), firewire (firewire), a global system for mobile communication (global system for mobile communication, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), Bluetooth, wireless fidelity (wireless fidelity, Wi-Fi), NFC, voice over Internet protocol (voice over Internet protocol, VoIP), a communication protocol supporting a network slice architecture, or any other suitable communication protocol. For example, in some embodiments, the electronic device 101 may establish a Wi-Fi connection to the electronic device 102 by using the Wi-Fi protocol.

For example, the electronic device 101 may be used as a destination device, and the electronic device 102 may be used as a source device of the electronic device 101. The electronic device 102 may project display content in a display interface of the electronic device 102 onto the electronic device 101, and as a destination device, the electronic device 101 may display, in a display interface of the electronic device 101, the display content sent by the electronic device 102.

Still as shown in FIG. 1, the communication system 100 may further include an electronic device 103. For example, the electronic device 103 may be a wearable device. For example, the electronic device 103 may also be used as a source device of the electronic device 101, and also project display content in a display interface of the electronic device 103 onto the electronic device 101. Similarly, the electronic device 101 may also display, in the display interface of the electronic device 101, the display content sent by the electronic device 103.

In this embodiment of this application, one destination device (for example, the electronic device 101) may simultaneously receive display content sent by a plurality of source devices (for example, the electronic device 102 and the electronic device 103), and the destination device may simultaneously present, in a display interface of the destination device, display content sent by different source devices.

Still for example, the electronic device 101 is a destination device, and the electronic device 102 and the electronic device 103 are source devices.

The electronic device 102 may identify each control in the display interface (for example, a first interface) of the electronic device 102, and determine one or more controls (referred to as first target controls below) that currently need to be projected onto the electronic device 101. Further, the electronic device 102 may send the first target control and a related drawing instruction to the electronic device 101.

In addition, the electronic device 103 may also identify each control in the display interface (for example, a second interface) of the electronic device 103, and determine one or more controls (referred to as second target controls below) that currently need to be projected onto the electronic device 101. Further, the electronic device 103 may send the second target control and a related drawing instruction to the electronic device 101.

Further, the electronic device 101 may invoke the drawing instruction sent by the electronic device 102, to draw the first target control in the display interface of the electronic device 101. In addition, the electronic device 101 may further invoke the drawing instruction sent by the electronic device 103, to draw the second target control in the display interface of the electronic device 101. In this way, the electronic device 101 can finally display a screen mirroring interface that includes the first target control and the second target control. Both content on which a first source device (namely, the electronic device 102) needs to perform screen mirroring and content on which a second source device (namely, the electronic device 103) needs to perform screen mirroring are displayed in the screen mirroring interface.

In other words, in a screen mirroring scenario, a destination device can simultaneously display content in a plurality of source devices, so that a user can view, in one destination device, display content in the plurality of source devices without performing switching between the plurality of source devices, thereby improving a display effect and user experience of screen mirroring display between a plurality of devices.

Certainly, any one or more electronic devices in the communication system 100 may be used as source devices or destination devices. This is not limited in this embodiment of this application.

In some embodiments, specific structures of the electronic device 101, the electronic device 102, and the electronic device 103 may be the same or different.

For example, each of the electronic devices may be specifically a mobile phone, a tablet computer, a smart television, a wearable electronic device, an in-vehicle infotainment system, a notebook computer, an ultra-mobile personal computer (ultra-mobile personal computer, UMPC), a handheld computer, a netbook, a personal digital assistant (personal digital assistant, PDA), or a virtual reality device. This is not limited in this embodiment of this application.

Figure 2:
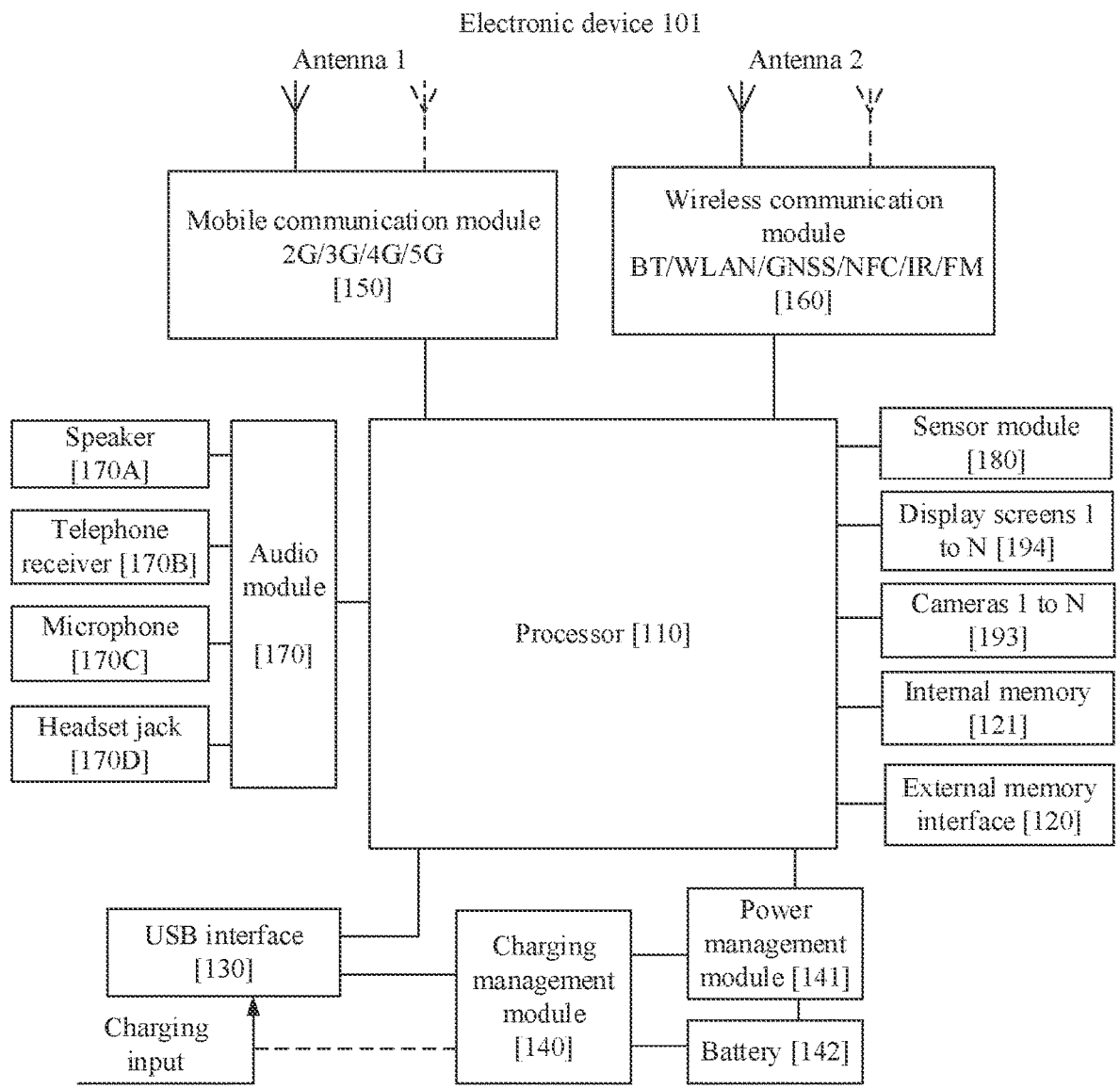
FIG. 2 is a schematic structural diagram 1 of an electronic device according to an embodiment of this application.

The electronic device 101 is used as an example. FIG. 2 is a schematic structural diagram of the electronic device 101.

The electronic device 101 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a telephone receiver 170B, a microphone 170C, a headset jack 170D, a sensor module 180, a camera 193, a display screen 194, and the like.

It may be understood that the structure illustrated in this embodiment of the present invention does not constitute a specific limitation on the electronic device 101. In some other embodiments of this application, the electronic device 101 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

A memory may be further disposed in the processor 110, and is configured to store instructions and data. In some embodiments, the memory in the processor 110 is a cache memory. The memory may store instructions or data just used or used cyclically by the processor 110. If the processor 110 needs to use the instructions or the data again, the processor 110 may directly invoke the instructions or the data from the memory. Therefore, repeated access is avoided, and a waiting time of the processor 110 is reduced, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The charging management module 140 is configured to receive charging input from a charger. The charger may be a wireless charger, or may be a wired charger. In some embodiments of wired charging, the charging management module 140 may receive charging input from the wired charger through the USB interface 130. In some embodiments of wireless charging, the charging management module 140 may receive wireless charging input through a wireless charging coil of the electronic device 101. When charging the battery 142, the charging management module 140 may further supply power to the electronic device by using the power management module 141.

The power management module 141 is configured to connect to the battery 142, the charging management module 140, and the processor 110. The power management module 141 receives input from the battery 142 and/or the charging management module 140, and supplies power to the processor 110, the internal memory 121, the display screen 194, the camera 193, the wireless communication module 160, and the like. The power management module 141 may be further configured to monitor parameters such as a battery capacity, a quantity of battery cycles, and a battery health status (leakage or impedance). In some other embodiments, the power management module 141 may also be disposed in the processor 110. In some other embodiments, the power management module 141 and the charging management module 140 may also be disposed in a same component.

A wireless communication function of the electronic device 101 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 101 may be configured to cover one or more communication frequency bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communication module 150 may provide a solution that is applied to the electronic device 101 and that includes wireless communication such as 2G/3G/4G/5G. The mobile communication module 150 may include one or more filters, switches, power amplifiers, low noise amplifiers (low noise amplifiers, LNAs), and the like. The mobile communication module 150 may receive an electromagnetic wave by using the antenna 1, perform processing such as filtering and amplification on the received electromagnetic wave, and transmit an electromagnetic wave obtained after processing to the modem processor for demodulation. The mobile communication module 150 may further amplify a signal obtained after modulation by the modem processor, and convert the signal into an electromagnetic wave and radiate the electromagnetic wave by using the antenna 1. In some embodiments, at least some function modules of the mobile communication module 150 may be disposed in the processor 110. In some embodiments, at least some function modules of the mobile communication module 150 may be disposed in a same component as at least some modules of the processor 110.

The modem processor may include a modulator and a demodulator. The modulator is configured to modulate a to-be-sent low-frequency baseband signal into an intermediate-high-frequency signal. The demodulator is configured to demodulate a received electromagnetic wave signal into a low-frequency baseband signal. Then the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (not limited to the speaker 170A, the telephone receiver 170B, and the like), or displays an image or a video by using the display screen 194.

In some embodiments, the modem processor may be a standalone component. In some other embodiments, the modem processor may be independent of the processor 110 and disposed in a same component as the mobile communication module 150 or another function module.

The wireless communication module 160 may provide a solution that is applied to the electronic device 101 and that includes wireless communication such as a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communication module 160 may be one or more components integrating one or more communication processing modules. The wireless communication module 160 receives an electromagnetic wave by using the antenna 2, performs frequency modulation and filtering processing on the electromagnetic wave signal, and sends a signal obtained after processing to the processor 110. The wireless communication module 160 may further receive a to-be-sent signal from the processor 110, perform frequency modulation and amplification on the to-be-sent signal, and convert the signal into an electromagnetic wave and radiate the electromagnetic wave by using the antenna 2.

In some embodiments, the antenna 1 of the electronic device 101 is coupled to the mobile communication module 150, and the antenna 2 is coupled to the wireless communication module 160, so that the electronic device 101 can communicate with a network and another device by using a wireless communication technology. The wireless communication technology may include a global system for mobile communication (global system for mobile communication. GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (Beidou navigation satellite system, BDS), a quasi-zenith satellite system (quasi-zenith satellite system, QZSS), and/or a satellite based augmentation system (satellite based augmentation systems, SBAS).

The electronic device 101 implements a display function by using the GPU, the display screen 194, the application processor, and the like. The GPU is a microprocessor for image processing, and is connected to the display screen 194 and the application processor. The GPU is configured to perform mathematical and geometric calculation for graphics rendering. The processor 110 may include one or more GPUs that execute program instructions to generate or change display information.

The display screen 194 is configured to display an image, a video, and the like. The display screen 194 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light-emitting diode (quantum dot light-emitting diode, QLED), or the like. In some embodiments, the electronic device 101 may include one or N display screens 194, where N is a positive integer greater than 1.

The electronic device 101 may implement a photographing function by using the ISP, the camera 193, the video codec, the GPU, the display screen 194, the application processor, and the like.

The ISP is configured to process data fed back by the camera 193. For example, during photographing, a shutter is opened, light is transmitted to a camera photosensitive element by using a lens, an optical signal is converted into an electrical signal, and the camera photosensitive element transmits the electrical signal to the ISP for processing, so that the electrical signal is converted into an image visible to a naked eye. The ISP may further perform algorithm optimization on noise, brightness, and a skin color of the image. The ISP may further optimize parameters such as exposure and a color temperature of a photographing scene. In some embodiments, the ISP may be disposed in the camera 193.

The camera 193 is configured to capture a still image or a video. An optical image of an object is generated by using the lens and projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP, to convert the electrical signal into a digital image signal. The ISP outputs the digital image signal to the DSP for processing. The DSP converts the digital image signal into an image signal in a standard format such as RGB or YUV. In some embodiments, the electronic device 101 may include one or N cameras 193, where N is a positive integer greater than 1.

The digital signal processor is configured to process a digital signal. In addition to a digital image signal, the digital signal processor may process another digital signal. For example, when the electronic device 101 selects a frequency, the digital signal processor is configured to perform Fourier transform and the like on frequency energy.

The video codec is configured to compress or decompress a digital video. The electronic device 101 may support one or more video codecs. In this case, the electronic device 101 may play or record videos in a plurality of encoding formats, for example, moving picture experts group (moving picture experts group, MPEG)-1, MPEG-2, MPEG-3, and MPEG-4.

The external memory interface 120 may be configured to connect to an external storage card such as a micro SD card, to extend a storage capability of the electronic device 101. The external storage card communicates with the processor 110 through the external memory interface 120, to implement a data storage function. For example, a file such as music or a video is stored in the external storage card.

The internal memory 121 may be configured to store one or more computer programs, and the one or more computer programs include instructions. The processor 110 may run the instructions stored in the internal memory 121, so that the electronic device 101 performs the screen mirroring display method provided in some embodiments of this application, various functional applications, data processing, and the like. The internal memory 121 may include a program storage area and a data storage area. The program storage area may store an operating system. The program storage area may further store one or more applications (for example, Photos or Contacts) and the like. The data storage area may store data (for example, a photo or a contact) created in a process of using the electronic device 101, and the like. In addition, the internal memory 121 may include a high-speed random access memory, or may include a non-volatile memory such as one or more magnetic disk storage components, flash memory components, or universal flash storage (universal flash storage, UFS). In some other embodiments, the processor 110 runs the instructions stored in the internal memory 121 and/or instructions stored in the memory disposed in the processor, so that the electronic device 101 performs the screen mirroring display method provided in the embodiments of this application, various functional applications, and data processing.

The electronic device 101 may implement an audio function such as music play or recording by using the audio module 170, the speaker 170A, the telephone receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some function modules of the audio module 170 may be disposed in the processor 110.

The speaker 170A, also referred to as a "horn", is configured to convert an audio electrical signal into a sound signal. The electronic device 101 may listen to music or answer a hands-free call by using the speaker 170A.

The telephone receiver 170B, also referred to as an "earpiece", is configured to convert an audio electrical signal into a sound signal. When answering a call or listening to voice information, the electronic device 101 may listen to a voice by placing the telephone receiver 170B close to an ear.

The microphone 170C is configured to convert a sound signal into an electrical signal. When making a call or sending voice information, a user may utter a voice by making a mouth close to the microphone 170C, and enter a sound signal to the microphone 170C. One or more microphones 170C may be disposed in the electronic device 101. In some other embodiments, two microphones 170C may be disposed in the electronic device 101, to implement a denoising function in addition to collecting a sound signal. In some other embodiments, three, four, or more microphones 170C may be disposed in the electronic device 101, to collect a sound signal, perform denoising, identify a sound source, implement a directional recording function, and the like.

The headset jack 170D is configured to connect to a wired headset. The headset jack 170D may be the USB interface 130, a 3.5 mm open mobile terminal platform (open mobile terminal platform, OMTP) standard interface, or a cellular telecommunication industry association of the USA (cellular telecommunication industry association of the USA, CTIA) standard interface.

The sensor module 180 may include a pressure sensor, a gyroscope sensor, a barometric pressure sensor, a magnetic sensor, an acceleration sensor, a distance sensor, a proximity light sensor, a fingerprint sensor, a temperature sensor, a touch sensor, an ambient light sensor, a bone conduction sensor, and the like.

In addition, the electronic device may further include one or more components such as a key, a motor, an indicator, and a SIM card interface. This is not limited in this embodiment of this application.

A software system of the electronic device 101 may use a hierarchical architecture, an event-driven architecture, a microkernel architecture, a microservice architecture, or a cloud architecture. In the embodiments of this application, an Android system with a hierarchical architecture is used as an example to describe a software structure of the electronic device 101.

Figure 3:
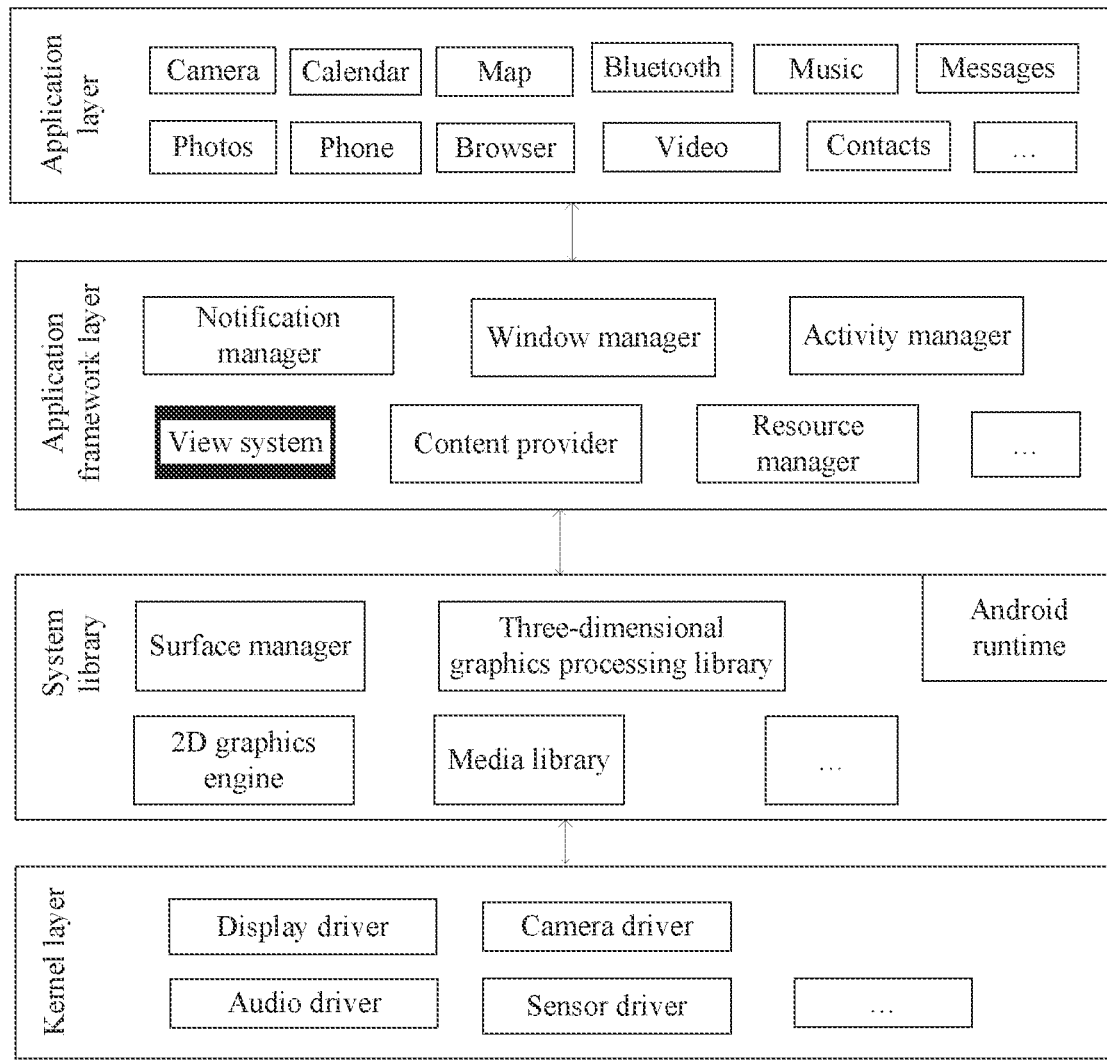
FIG. 3 is a schematic architectural diagram of an operating system in an electronic device according to an embodiment of this application.

FIG. 3 is a block diagram of software of the electronic device 101 according to an embodiment of this application.

In the hierarchical architecture, the software is divided into several layers. Each layer has a clear role and function. The layers communicate with each other through a software interface. In some embodiments, the Android system is divided into four layers from top to bottom: an application layer, an application framework layer, Android runtime (Android runtime) and a system library, and a kernel layer.

1. Application Layer

The application layer may include a series of applications.

As shown in FIG. 3, the applications may include APPs (applications) such as Phone, Contacts, Camera, Photos, Calendar, Map, Navigation, Bluetooth, Music, Video, and Messages.

2. Application Framework Layer

The application framework layer provides an application programming interface (application programming interface, API) and a programming framework for the applications in the application layer. The application framework layer includes some predefined functions.

As shown in FIG. 3, the application framework layer may include a view system (view system), a notification manager, an activity manager, a window manager, a content provider, a resource manager, an input method manager, and the like.

The view system may be configured to construct a display interface of an application. Each display interface may include one or more controls. Generally, the control may include interface elements such as an icon, a button, a menu, a tab, a text box, a dialog box, a status bar, a navigation bar, and a widget (widget).

When drawing the display interface, the view system may obtain view information corresponding to the display interface. The view information records a layer relationship between controls in the display interface that needs to be drawn. For example, the controls in the display interface are usually organized by layer based on a tree structure, to form a complete view tree (view tree), and the view tree may be referred to as the view information of the display interface. The view system may draw the display interface based on the layer relationship between the controls that is set in the view tree. Drawing each control in the display interface corresponds to a group of drawing instructions, for example, DrawLine, DrawPoint, and DrawBitmap.

Figure 4A:
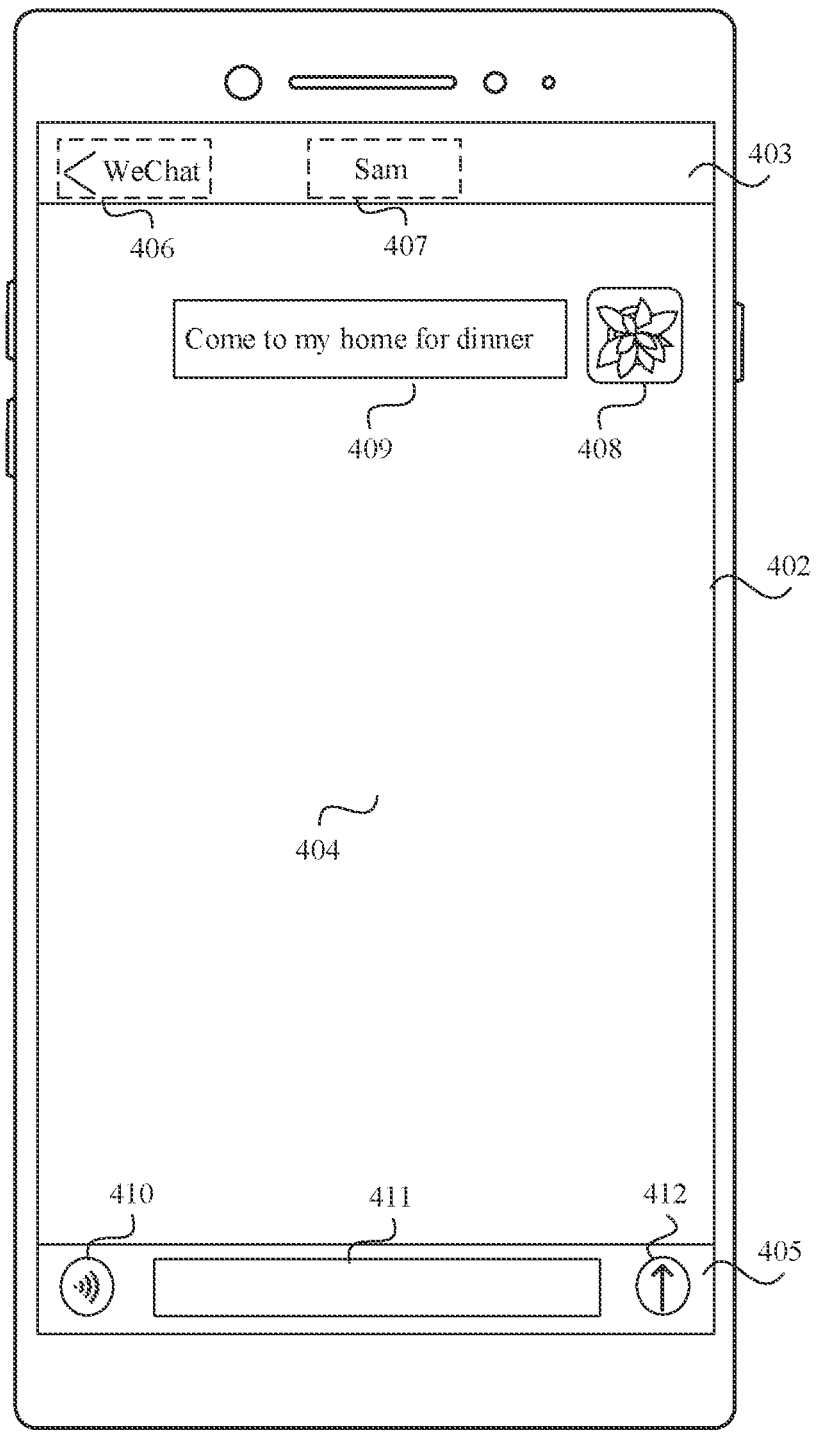
FIG. 4(a) and FIG. 4(b) are a schematic diagram 1 of an application scenario of a screen mirroring display method according to an embodiment of this application.
Figure 4B:
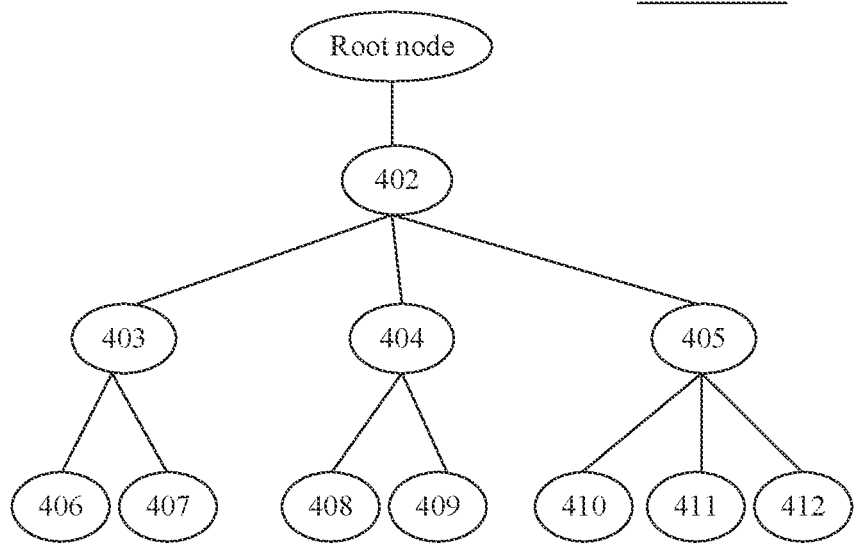

For example, FIG. 4(*a*) shows a chat interface 401 of a WeChat APP. A control at a bottommost layer in the chat interface 401 is a root (root) node, a control named a base map 402 is set under the root node, and the base map 402 further includes the following controls: a title bar 403, a chat background 404, and an input bar 405. The title bar 403 further includes a back button 406 and a title 407, the chat background 404 further includes a profile photo 408 and a bubble 409, and the input bar 405 further includes a voice input button icon 410, an input box 411, and a sending button 412.

The controls may be layered in order to form a view tree A shown in FIG. 4(*b*). The base map 402 is a child node of a root node, and all of the title bar 403, the chat background 404, and the input bar 405 are child nodes of the base map 402. Both the back button 406 and the title 407 are child nodes of the title bar 403. Both the profile photo 408 and the bubble 409 are child nodes of the chat background 404. All of the voice input button icon 410, the input box 411, and the sending button 412 are child nodes of the input bar 405. When drawing the chat interface 401, the view system may invoke a drawing instruction of a corresponding control by layer starting from the root node based on a layer relationship between the controls in the view tree A, to draw each control to finally obtain the chat interface 401.

In this embodiment of this application, a screen mirroring management module may be added to a view system of a source device.

After a user enables a screen mirroring function of the source device, the screen mirroring management module may record a drawing instruction for drawing each control in a display image by the view system and a drawing resource (for example, a profile photo or an icon) required by the drawing instruction. In addition, the screen mirroring management module may generate, based on a view tree 1 of a current display image, a view tree 2 of a screen mirroring interface that currently needs to be displayed on a destination device. A quantity of controls in the view tree 2 may be different from a quantity of controls in the view tree 1, and a location relationship between the controls in the view tree 2 may also be different from a location relationship between the controls in the view tree 1. Further, the screen mirroring management module may indicate the source device to send the view tree 2 and a drawing instruction and a drawing resource of each control in the view tree 2 to the destination device, so that the destination device can invoke a drawing instruction of a corresponding control by layer based on a layer relationship between the controls in the view tree 2, to draw the screen mirroring interface that exists after screen mirroring.

When a same destination device has a plurality of different source devices, each source device can send a view tree on which screen mirroring currently needs to be performed and a related drawing instruction and drawing resource to the destination device according to the foregoing method.

Correspondingly, a screen mirroring management module may also be disposed in a view system of the destination device.

For example, the destination device may receive a first UI message sent by a source device 1, where the first UI message may include a view tree A and a drawing instruction and a drawing resource of each control in the view tree A, and the destination device may receive a second UI message sent by a source device 2, where the second UI message may include a view tree B and a drawing instruction and a drawing resource of each control in the view tree B. Further, the screen mirroring management module of the destination device may perform an operation such as splitting, deleting, or recombination on controls in the view tree A and the view tree B based on the view tree A and the view tree B, to generate a view tree C of a screen mirroring interface that currently needs to be displayed. In this way, the destination device can invoke a drawing instruction and a drawing resource of a corresponding control by layer based on a layer relationship between controls in the view tree C, to draw the screen mirroring interface that exists after screen mirroring.

In this way, the screen mirroring interface finally drawn by the destination device includes the controls in the view tree A and the controls in the view tree B, in other words, the screen mirroring interface includes both display content in the source device 1 and display content in the source device 2. The user can simultaneously view, in one destination device, display content in different source devices, so that a display effect of the destination device and user experience in a screen mirroring scenario are improved.

It should be noted that the screen mirroring management module may be separately disposed in the application framework layer and independent of the view system, and this is not limited in this embodiment of this application.

In addition, the activity manager may be configured to manage a lifecycle of each application. The application usually runs in an operating system in a form of an activity. The activity manager may schedule an activity process of the application to manage the lifecycle of each application. The window manager is configured to manage a window program. The window manager may obtain a size of a display screen, determine whether there is a status bar, lock the screen, capture the screen, and the like. The content provider is configured to store and obtain data and make the data accessible to an application. The data may include a video, an image, audio, calls that are made and answered, a browsing history, a bookmark, an address book, and the like. The resource manager provides various resources such as a localized string, an icon, a picture, a layout file, and a video file for an application.

3. Android Runtime and System Library

The Android runtime includes a kernel library and a virtual machine. The Android runtime is responsible for scheduling and management of the Android system.

The kernel library includes two parts: a functional function that needs to be invoked by a Java language and an Android kernel library.

The application layer and the application framework layer run in the virtual machine. The virtual machine executes Java files of the application layer and the application framework layer to obtain binary files. The virtual machine is configured to perform functions such as object lifecycle management, stack management, thread management, security and abnormality management, and garbage collection.

The system library may include a plurality of function modules, for example, a surface manager (surface manager), a media library (media library), a three-dimensional graphics processing library (for example, OpenGL ES), and a 2D graphics engine (for example, an SGL).

The surface manager is configured to manage a display subsystem and provide fusion of 2D and 3D layers for a plurality of applications. The media library supports playback and recording of a plurality of commonly used audio and video formats, a still image file, and the like. The media library may support a plurality of audio and video encoding formats such as MPEG-4, H.264, MP3, AAC, AMR, JPG, and PNG. The three-dimensional graphics processing library is configured to implement three-dimensional graphics drawing, image rendering, composition, layer processing, and the like. The 2D graphics engine is a drawing engine for 2D drawing.

4. Kernel Layer

The kernel layer is a layer between hardware and software. The kernel layer includes at least a display driver, a camera driver, an audio driver, a sensor driver, and the like. This is not limited in this embodiment of this application.

With reference to the accompanying drawings, the following describes in detail a screen mirroring display method provided in the embodiments of this application.

Figure 5A:
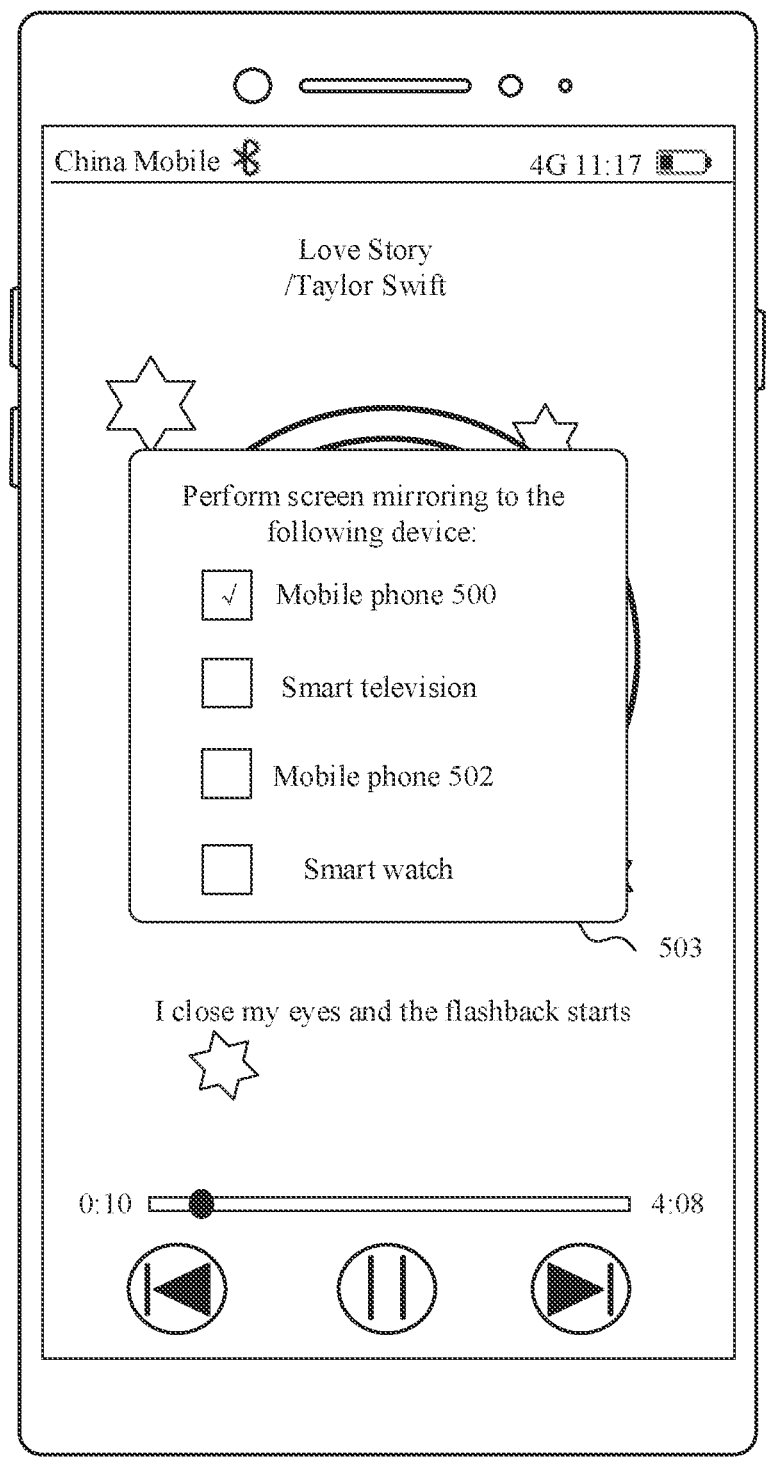
FIG. 5(a) and FIG. 5(b) are a schematic diagram 2 of an application scenario of a screen mirroring display method according to an embodiment of this application.

For example, as shown in FIG. 5(a), after the user enables a screen mirroring function in a mobile phone 501, the mobile phone 501 may be used as a source device. In addition, the mobile phone 501 may display a prompt box 503, and the prompt box 503 includes one or more candidate devices that may be used as destination devices for screen mirroring. The user may select a candidate device from the prompt box 503 as a destination device of current screen mirroring. For example, if it is detected that the user taps "mobile phone 500" in the prompt box 503, the mobile phone 501 may determine that the destination device of the current screen mirroring is the mobile phone 500.

The candidate device in the prompt box 503 may be an electronic device located in a same communication network as the mobile phone 501. For example, each candidate device in the prompt box 503 is an electronic device in a Wi-Fi network accessed by the mobile phone 501. For another example, each candidate device in the prompt box 503 is an electronic device bound to a mobile phone account in to which the mobile phone 501 logs.

Figure 5B:
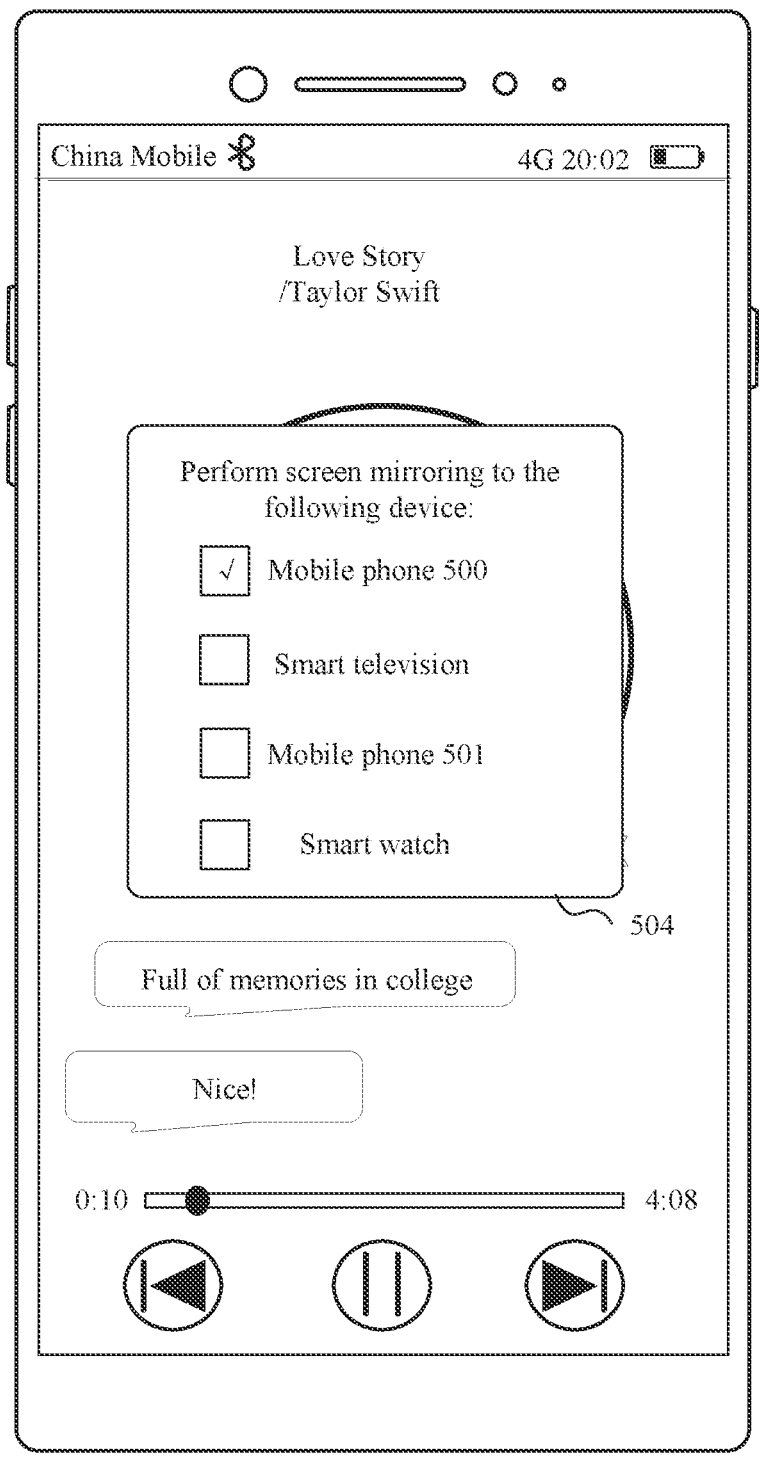

Similarly, as shown in FIG. 5(*b*), after the user enables a screen mirroring function in a mobile phone 502, the mobile phone 502 may also be used as a source device. In addition, the mobile phone 502 may display a prompt box 504, and similar to the prompt box 503, the prompt box 504 also includes one or more candidate devices that may be used as destination devices for screen mirroring. The user may select a candidate device from the prompt box 504 as a destination device of current screen mirroring. For example, if it is detected that the user taps "mobile phone 500" in the prompt box 504, the mobile phone 502 may determine that the destination device of the current screen mirroring is the mobile phone 500.

The candidate device in the prompt box 504 may be an electronic device located in a same communication network as the mobile phone 502. For example, each candidate device in the prompt box 504 is an electronic device in a Wi-Fi network accessed by the mobile phone 502. For another example, each candidate device in the prompt box 504 is an electronic device bound to a mobile phone account in to which the mobile phone 502 logs.

It can be learned that when the mobile phone 500, the mobile phone 501, and the mobile phone 502 belong to a same communication network, one of the mobile phones may be used as a destination device of the other two mobile phones to perform screen mirroring display. For example, a destination device to which the mobile phone 501 (namely, a first source device) performs screen mirroring is the mobile phone 500, and a destination device to which the mobile phone 502 (namely, a second source device) performs screen mirroring is also the mobile phone 500.

Certainly, the user may alternatively set an electronic device (for example, the mobile phone 500) as a destination device, and select, in the destination device, a plurality of electronic devices (for example, the mobile phone 501 and the mobile phone 502) as source devices of current screen mirroring. This is not limited in this embodiment of this application.

Still for example, the mobile phone 501 and the mobile phone 502 are source devices of current screen mirroring, and the mobile phone 500 is a destination device of the current screen mirroring.

Figure 6:
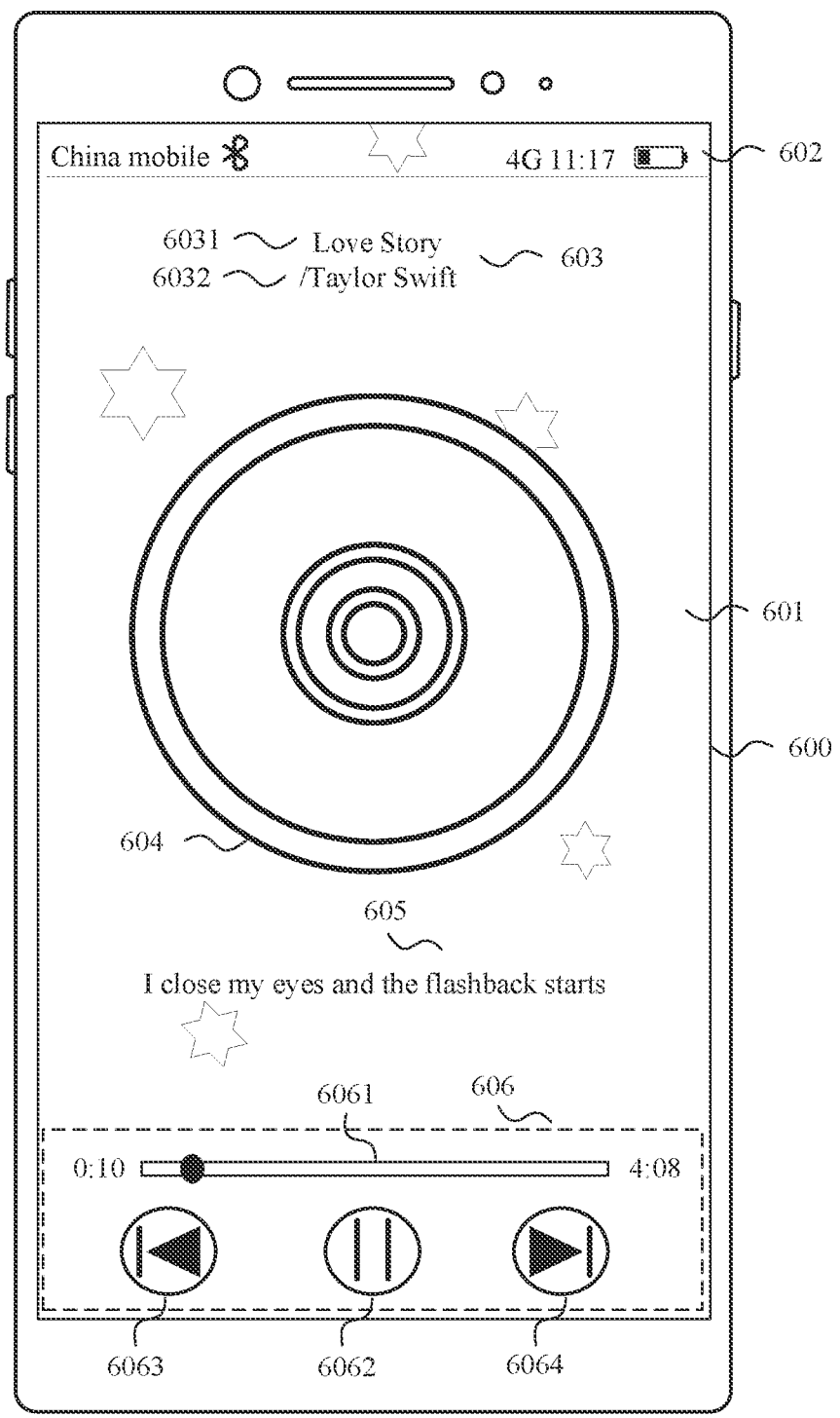
FIG. 6 is a schematic diagram 3 of an application scenario of a screen mirroring display method according to an embodiment of this application.

As shown in FIG. 6, if a playback interface 600 of a first music APP is displayed after the mobile phone 501 enables the screen mirroring function, it indicates that display content in the playback interface 600 needs to be projected onto the mobile phone 500) for display. For example, the playback interface 600 includes the following controls: a base map 601, a status bar 602, a title bar 603, an album cover 604, lyrics 605, and a control bar 606. The status bar 602 includes controls such as time, signal strength, and a battery capacity. The title bar 603 includes controls such as a song name 6031 and a singer 6032. The control bar 606 includes controls such as a progress bar 6061, a pause button 6062, a "previous" button 6063, and a "next" button 6064.

Figure 7:
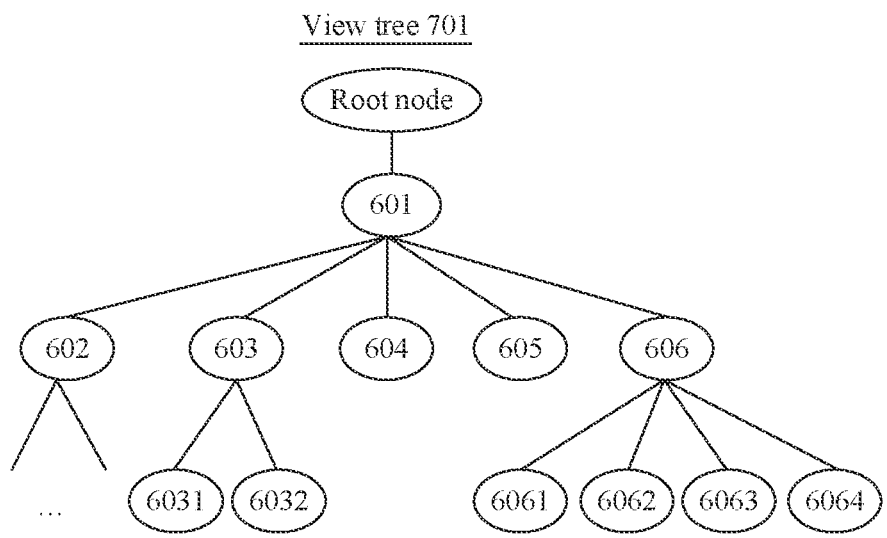
FIG. 7 is a schematic diagram 4 of an application scenario of a screen mirroring display method according to an embodiment of this application.

Further, the mobile phone 501 may obtain corresponding view information for drawing the playback interface 600 by a view system. For example, a view tree is view information. The mobile phone 501 may obtain a view tree of the playback interface 600 and a drawing instruction and a drawing resource of each control in the view tree. For example, FIG. 7 shows a view tree 701 of the playback interface 600. The view tree 701 records a layer relationship between the controls in the playback interface 600. In the view tree 701, a root node of the playback interface 600 includes a child node named the base map 601, and all of the status bar 602, the title bar 603, the album cover 604, the lyrics 605, and the control bar 606 are child nodes of the base map 601. The song name 6031 and the singer 6041 are child nodes of the title bar 603. The progress bar 6061, the pause button 6062, the "previous" button 6063, and the "next" button 6064 are child nodes of the control bar 606.

After obtaining the view tree 701 of the playback interface 600, the mobile phone 501 may further determine one or more controls (namely, first target controls) in the playback interface 600 that need to be projected onto the mobile phone 500 for display.

For example, a configuration file corresponding to the playback interface 600 may be preset in the mobile phone 501. Alternatively, the mobile phone 501 may obtain a configuration file corresponding to the playback interface 600 from a server. The configuration file records one or more controls in the playback interface 600 that need to be projected by the source device onto the destination device.

For example, identifiers of one or more controls in the playback interface 600 that need to be projected onto the destination device may be recorded in the configuration file. In this case, the mobile phone 501 may determine, based on the identifiers that are of the controls and that are recorded in the configuration file, first target controls in the playback interface 600 that need to be projected onto the mobile phone 500 for display. For another example, when first music APPs of different versions run the playback interface 600, identifiers of controls in the playback interface 600 may be updated, and therefore the first target controls determined by using the identifiers of the controls m the configuration file may be inaccurate. In this case, specific display locations of one or more controls, for example, coordinates of the controls, in the playback interface 600 that need to be projected onto the destination device may also be recorded in the configuration file. In this way, the mobile phone 501 can uniquely determine, based on the display locations that are of the controls in the playback interface 600 and that are recorded in the configuration file, the first target controls in the playback interface 600 that need to be projected onto the mobile phone 500 for display.

Certainly, for different types of destination devices, the mobile phone 501 may preset a plurality of configuration files corresponding to the playback interface 600. For example, when the destination device is a device of a mobile phone type, a configuration file corresponding to the playback interface 600 is a configuration file 1 and when the destination device is a device of a watch type, a configuration file corresponding to the playback interface 600 is a configuration file 2. Therefore, the mobile phone 501 may obtain, based on a type of a destination device (for example, the mobile phone 500) currently selected by the user, a configuration file (for example, the configuration file 1) corresponding to the playback interface 600.

For example, the configuration file 1 corresponding to the playback interface 600 may be:

```
"packagename": "*****",        //identifier of the first music application;
"data": [{
    "activityname": "*****",   //identifier of the playback interface 600;
    "src1": {                  //display location of a control 1 in the source device;
       "left": ***,
       "top": ***,
       "width": ***,
       "height": ***
      },
    "src2": {                  //display location of a control 2 in the source device;
       "left": ***,
       "top": ***,
       "width": ***,
       "height": ***
      },
...
```

It should be noted that the configuration file may be stored in the mobile phone or the server in a format such as a JSON (JavaScript object notation) format, an XML (extensible markup language) format, or a text format, and this is not limited in this embodiment of this application.

It can be learned that the configuration file 1 includes a plurality of "src" fields (for example, the "src1" field and the "src2" field). Each "src" field records a specific location of one control in the playback interface 600. For example, a location of each control may be uniquely determined by using values of four parameters: left, top, width, and height, where left is a value of a vertex at an upper left corner of the control on an x-axis, top is a value of the vertex at the upper left corner of the control on a y-axis, width is a width of the control, and height is a height of the control. One or more controls recorded in the configuration file 1 are the first target controls that need to be projected by the mobile phone 501 onto the mobile phone 500 for display.

For example, after detecting that the user selects the mobile phone 500 as a destination device in the mobile phone 501, the mobile phone may preset one or more configuration files for a mobile phone type. In addition, the mobile phone 501 may obtain a package name (packagename) of the first music APP currently running in the foreground and an activity name of the currently displayed playback interface 600. Further, the mobile phone 501 may search, based on the package name and the activity name, the obtained configuration files for the configuration file 1 corresponding to the playback interface 600. Further, the mobile phone 501 may identify-, based on a location of each control recorded in the "src" field in the configuration file 1, the first target control that is in the playback interface 600 and that needs to be projected onto the mobile phone 500 for display.

Alternatively, the user may manually specify, in the playback interface 600, the first target control to be projected onto the mobile phone 500 for display. For example, the mobile phone 501 may detect a touch event of the user in the playback interface 600. If it is detected that the user executes a preset touch event at a point A in the playback interface 600, the mobile phone may search the configuration file 1 for a corresponding control based on coordinates of the point A, and determine the found control as the first target control to be projected onto the mobile phone 500 for display.

In some embodiments, the configuration file 1 may further record a specific display location that is of the first target control and that is in the destination device after screen mirroring. For example, a "dest1" field corresponding to the "src1" field may be set in the configuration file 1, and the "dest1" field is used to indicate a display location of the control 1 in the destination device. For example, the "dest1" field is as follows:

```
"dest1": {    //display location of the control 1 in the destination device;
    "left": ***,
    "top": ***,
    "width": ***,
    "height": ***
   }
```

Therefore, the mobile phone 501 may determine, based on each "dest" field in the configuration file 1, a specific display location that is of each first target control in each playback interface 600 and that is in the destination device (namely, the mobile phone 500) after screen mirroring.

In some other embodiments, the configuration file 1 may further record a change of display locations of the first target control before and after screen mirroring. For example, the following fields are further set for the control 1 in the configuration file 1:

```
"translationx": ***,    //translation distance of the control 1 on the x-axis;
"translationy": ***,    //translation distance of the control 1 on the y-axis;
"scalex": ***,          //scale ratio of the control 1 on the x-axis;
"scaley": ***,          /scale ratio of the control 1 on the y-axis;
"rotatedegree": ***,    /rotate degree of the control 1;
   "order": ***,        //layer of the control 1
```

The "translationx" field and the "translationy" field are respectively used to indicate the translation distances of the control 1 on the x-axis and the y-axis after screen mirroring, the "scalex" field and the "scaley" field are respectively used to indicate the scale ratios of the control 1 on the x-axis and the y-axis after screen mirroring, the "rotatedegree" field is used to indicate the rotate degree of the control 1 after screen mirroring, and the "order" field is used to indicate a location of the layer at which the control 1 is located (for example, a bottommost layer or a topmost layer) after screen mirroring.

Similarly, the mobile phone 501 may also determine, based on a change of display locations of the control 1 in the foregoing fields before and after screen mirroring, a specific display location that is of the control 1 and that is in the destination device (namely, the mobile phone 500) after screen mirroring.

For example, after identifying, based on the configuration file 1, the first target control in the playback interface 600 and the specific display location of the first target control after screen mirroring, the mobile phone 501 may generate, based on the view tree 701 of the playback interface 600, a new view tree including the first target control.

For example, first target controls in the playback interface 600 that are identified by the mobile phone 501 based on the configuration file 1 include the song name 6031 and the singer 6041 in the title bar 603, the pause button 6062, the "previous" button 6063, and the "next" button 6064 in the control bar 606, and the album cover 604. In addition, a location relationship between these controls does not change before and after screen mirroring. In other words, a layer relationship between the first target controls in the playback interface 600 is the same as a layer relationship between the first target controls in a subsequent screen mirroring interface.

Figure 8:
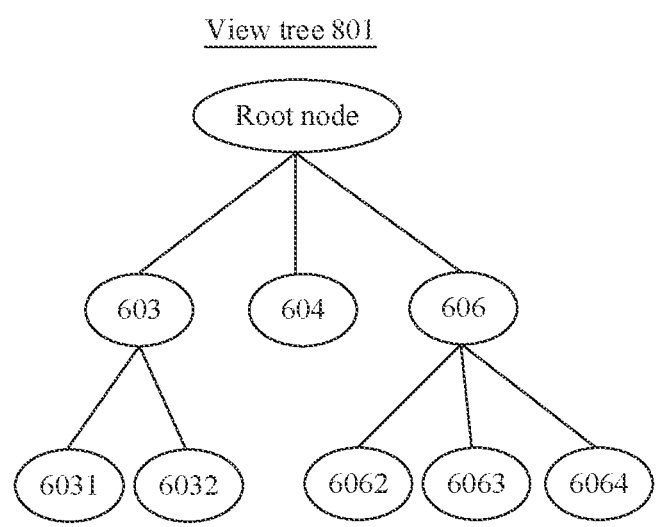
FIG. 8 is a schematic diagram 5 of an application scenario of a screen mirroring display method according to an embodiment of this application.

As shown in FIG. 8, after splitting the controls in the view tree 701, the mobile phone 501 may delete a node that is not a first target control (for example, the base map 601, the status bar 602, the lyrics 605, and the progress bar 6061 in the control bar 606). In addition, the mobile phone 501 may recombine retained first target controls based on a layer order in the view tree 701, to obtain a view tree 801 corresponding to the playback interface 600 after screen mirroring. In the view tree 801, a root node includes three child nodes named the title bar 603, the album cover 604, and the control bar 606, and the control bar 606 includes three child nodes named the pause button 6062, the "previous" button 6063, and the "next" button 6064.

Further, the mobile phone 501 (namely, the first source device) may send a first UI message to the mobile phone 500 (namely, the destination device) through the foregoing communication network 104. The first UI message includes the view tree 801 and a drawing instruction and a drawing resource related to each control in the view tree 801. For example, the mobile phone 501 and the mobile phone 500 may establish a socket connection based on a TCP/IP (transmission control protocol/Internet protocol). Further, the mobile phone may send the first UI message corresponding to the playback interface 600 to the mobile phone 500 through the socket connection.

Subsequently, when the mobile phone 501 updates the playback interface 600, the mobile phone 501 may continue to generate, according to the foregoing method, a first UI message corresponding to a new display interface, and send the new first UI message to the mobile phone 500.

In the foregoing embodiment, the first source device (for example, the mobile phone 501) is used as an execution body to describe the screen mirroring display method provided in the embodiments of this application. For a destination device (for example, the mobile phone 500), when a plurality of source devices simultaneously perform screen mirroring to the destination device, each source device may perform, according to the foregoing method, screen mirroring on one or more controls in a display interface of the source device to the destination device for display.

For example, when the mobile phone 501 performs screen mirroring to the mobile phone 500, the mobile phone 502 may also enable the screen mirroring function, and set a destination device of current screen mirroring to the mobile phone 500.

Figure 9:
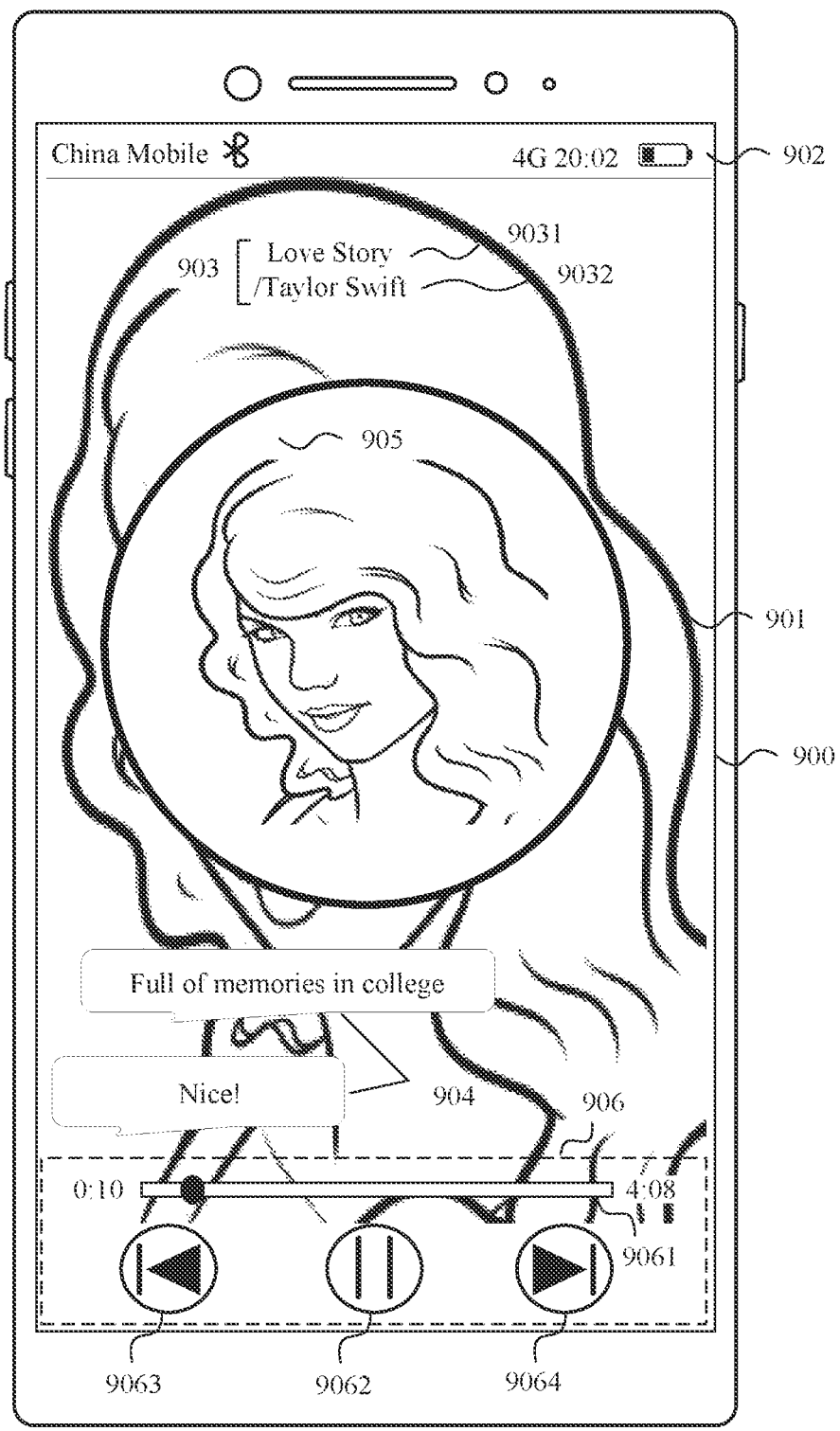
FIG. 9 is a schematic diagram 6 of an application scenario of a screen mirroring display method according to an embodiment of this application.

As shown in FIG. 9, if a playback interface 900 of a second music APP is displayed after the mobile phone 502 enables the screen mirroring function, it indicates that display content in the playback interface 900 needs to be projected onto the mobile phone 500 for display. For example, the playback interface 900 includes the following controls: a base map 901, a status bar 902, a title bar 903, a bullet-screen comment 904, an album cover 905, and a control bar 906. The status bar 902 includes controls such as time, signal strength, and a battery capacity. The title bar 903 includes controls such as a song name 9031 and a singer 9032. The control bar 906 includes controls such as a progress bar 9061, a pause button 9062, a "previous" button 9063, and a "next" button 9064. It can be learned that in comparison with the playback interface 600 of the first music APP, a function of viewing the bullet-screen comment is set in the playback interface 900 of the second music APP.

Similarly, the mobile phone 502 may obtain a view tree for drawing the playback interface 900 by a view system of the mobile phone 502 and a drawing instruction and a drawing resource of each control in the view tree. For example, FIG. 10(*a*) shows a view tree 1001 of the playback interface 900. The view tree 1001 records a layer relationship between the controls in the playback interface 900. In the view tree 1001, a root node of the playback interface 900 includes a child node named the base map 901, and all of the status bar 902, the title bar 903, the bullet-screen comment 904, the album cover 905, and the control bar 906 are child nodes of the base map 901. The song name 9031 and the singer 9041 are child nodes of the title bar 903. The progress bar 9061, the pause button 9062, the "previous" button 9063, and the "next" button 9064 are child nodes of the control bar 906.

In addition, the mobile phone 502 may further obtain, based on a package name of the second music APP and an activity name of the package name, a configuration file 2 corresponding to the playback interface 900. Similar to the configuration file 1, the configuration file 2 records a second target control that is in the playback interface 900 and that needs to be projected onto the destination device, for example, an identifier or a display location of the second target control in the playback interface 900.

Therefore, the mobile phone 502 may identify, based on the configuration file 2, the second target control that is in the view tree 1001 and on which screen mirroring to the mobile phone 500 needs to be performed for display. Certainly, the mobile phone 502 may alternatively use, as the second target control on which screen mirroring to the mobile phone 500 needs to be performed for display, a control manually set by the user in the playback interface 900.

For example, the second target control is the bullet-screen comment 904 in the playback interface 900. As shown in FIG. 10(*b*), after splitting and recombining the controls in the view tree 1001, the mobile phone 502 may generate a view tree 1002 corresponding to the playback interface 900 after screen mirroring. A root node of the view tree 1002 includes the bullet-screen comment 904.

Further, the mobile phone 502 (namely, the second source device) may send a second UI message to the mobile phone 500 (namely, the destination device) through the foregoing communication network 104. The second UI message includes the view tree 1002 and a drawing instruction and a drawing resource related to each control in the view tree

1002. Subsequently, when the mobile phone 502 updates the playback interface 900, the mobile phone 502 may continue to generate, according to the foregoing method, a second UI message corresponding to a new display interface, and send the new second UI message to the mobile phone 500.

In addition, the source device may send a UI message to the destination device in a form of a packet. Before sending a packet that carries a UI message, the source device may serialize (serialize) and compress the packet. Correspondingly, after receiving the packet sent by the source device, the destination device may decompress and deserialize the received packet, to parse out the UI message carried in the packet.

It can be learned that when each source device (for example, the mobile phone 501 and the mobile phone 502) performs screen mirroring on a display interface of the source device to the destination device, the source device may perform operations such as splitting, deleting, and recombination on controls in the display interface, so that a screen mirroring interface finally displayed on the destination device can adapt to a use requirement of the user, thereby improving a display effect and user experience of screen mirroring between a plurality of devices.

Still for example, a destination device of current screen mirroring is the mobile phone 500. A configuration file may also be prestored in the mobile phone 500. For example, different from the foregoing configuration file (for example, the configuration file 1) in the source device, the configuration file stored in the destination device (namely, the mobile phone 500) may include information related to target controls in a plurality of source devices.

For example, a configuration file 3 stored in the mobile phone 500 is as follows:

```
"packagename1": "*****",              //identifier of the first music application;
"data": [{
    "activityname": "*****",          //identifier of the playback interface 600;
    "src1": {                         //display location of the control 1 in the source device;
        "left": ***,
        "top": ***,
        "width": ***,
        "height": ***
    },
    "dest1": {                        //display location of the control 1 in the destination device;
        "left": ***,
        "top": ***,
        "width": ***,
        "height": ***
    }
    "translationx": ***,              //translation distance of the control 1 on the x-axis;
    "translationy": ***,              //translation distance of the control 1 on the y-axis;
    "scalex": ***,                    //scale ratio of the control 1 on the x-axis;
    "scaley": ***,                    /scale ratio of the control 1 on the y-axis;
    "rotatedegree": ***,              /rotate degree of the control 1;
    "order": ***,                     //layer of the control 1;
}]
"packagename2": "*****",              //identifier of the second music application;
"data": [{
    "activityname": "*****",          //identifier of the playback interface 900;
    "src2": {                         //display location of the control 2 in the source device;
        "left": ***,
        "top": ***,
        "width": ***,
        "height": ***
    },
    "dest2": {                        //display location of the control 2 in the destination device;
        "left": ***,
        "top": ***,
        "width": ***,
        "height": ***
    }
    "translationx": ***,              //translation distance of the control 2 on the x-axis;
    "translationy": ***,              //translation distance of the control 2 on the y-axis;
    "scalex": ***,                    //scale ratio of the control 2 on the x-axis;
    "scaley": ***,                    /scale ratio of the control 2 on the y-axis;
    "rotatedegree": ***,              /rotate degree of the control 2;
    "order": ***,                     //layer of the control 2;
}]
```

It can be learned that the configuration file 3 includes both the first target control in the playback interface 600 in the first music APP and the second target control in the playback interface 900 in the second music APP.

For example, the first UI message sent by the mobile phone 501 to the mobile phone 500 may carry the package name of the first music APP and the activity name of the playback interface 600, and the second UI message sent by the mobile phone 502 to the mobile phone 500 may carry the package name of the second music APP and the activity name of the playback interface 900. Therefore, after receiving the first UI message and the second UI message, the mobile phone 500 may obtain a configuration file (namely, the configuration file 3) that includes both the activity name of the playback interface 600 and the activity name of the playback interface 900.

For example, as shown in FIG. 11, after the mobile phone 500 receives the view tree 801 in the first UI message and the view tree 1002 in the second UI message, the mobile phone may determine, based on the configuration file 3, specific display locations of controls and a layer relationship between the controls in the view tree 801 and the view tree 1002 after screen mirroring, to generate a view tree 1101 corresponding to a screen mirroring interface. For example, if the configuration file 3 records a case in which the bullet-screen comment 904 in the playback interface 900 partially overlaps the album cover 604 in the playback interface 600, and a layer (order) of the bullet-screen comment 904 is located above a layer of the album cover 604, the mobile phone 500 may use the bullet-screen comment 904 as a child node of the album cover 604 in the view tree 1101 of the screen mirroring interface.

In addition, when locations of two nodes recorded in the configuration file 3 coincide, a "cascade mode" field may be further set in the configuration file 3. For example, a cascade mode may include gradient fusion, deepening fusion, or superposition. The mobile phone 500 may determine, based on the "cascade mode" field, a specific cascade mode of two nodes whose drawing locations coincide.

In some other embodiments, the mobile phone 500 may also store a configuration file used by each source device during screen mirroring, for example, the configuration file 1 and the configuration file 2. The configuration file 1 records the display location of the first target control after screen mirroring, and the configuration file 2 records the display location of the second target control after screen mirroring. Therefore, the mobile phone 500 may determine, based on the configuration file 1 and the configuration file 2, specific display locations of controls and a layer relationship between the controls in the view tree 801 and the view tree 1002 after screen mirroring, to generate a view tree 1101 corresponding to a screen mirroring interface.

For example, the mobile phone may obtain the corresponding configuration file 1 based on the package name of the first music APP and the activity name of the playback interface 600 in the first UI message. In addition, the mobile phone may obtain the corresponding configuration file 2 based on the package name of the second music APP and the activity name of the playback interface 900 in the second UI message. Therefore, as shown in FIG. 11, the mobile phone may generate, with reference to the display location of the first target control in the screen mirroring interface in the configuration file 1 and the display location of the second target control in the screen mirroring interface in the configuration file 2, the view tree 1101 corresponding to the current screen mirroring interface.

In addition, when the mobile phone 500 detects that a display location of a control (for example, the album cover 604) in the configuration file 1 overlaps a display location of a control (for example, the bullet-screen comment 904) in the configuration file 2, the mobile phone 500 may determine, based on an "order" field that is of the control named the album cover 604 and that is recorded in the configuration file 1 and an "order" field that is of the control named the bullet-screen comment 904 and that is recorded in the configuration file 2, a location relationship between the album cover 604 and the bullet-screen comment 904. For example, if a value of the "order" field of the album cover 604 in the configuration file 1 is 2, and a value of the "order" field of the bullet-screen comment 904 in the configuration file 2 is 1, it indicates that the bullet-screen comment 904 is located above a layer of the album cover 604, and still as shown in FIG. 11, the mobile phone 500 may set the bullet-screen comment 904 as a child node of the album cover 604. Certainly, when two controls overlap in the screen mirroring interface, the mobile phone 500 may further perform processing such as virtualization and translucency on the overlapping controls, so that a visual effect of viewing by the user is improved.

For another example, when the mobile phone 50) detects, by using the configuration file 1 and the configuration file 2, that the two controls named the album cover 604 and the bullet-screen comment 904 overlap, the mobile phone 500 may further modify a display location of the album cover 604 or the bullet-screen comment 904 in the screen mirroring interface, so that the album cover 604 does not overlap the bullet-screen comment 904. In this case, the mobile phone 500 may use both the album cover 604 and the bullet-screen comment 904 as child nodes of a root node.

In some other embodiments, the mobile phone 500 may also arrange a display location of each control in the screen mirroring interface based on a quantity of source devices. For example, when the mobile phone 500 has two source devices (for example, the mobile phone 501 and the mobile phone 502), the mobile phone may set the following case: The first target control in the view tree 801 sent by the mobile phone 501 is displayed on the left side of the screen mirroring interface, and the second target control in the view tree 1002 sent by the mobile phone 502 is displayed on the right side of the screen mirroring interface. Certainly, a person skilled in the art may further set a corresponding policy based on actual experience or an actual application scenario, so that the destination device can arrange, in the screen mirroring interface, a target control projected by each source device. This is not limited in this embodiment of this application.

Figure 12:
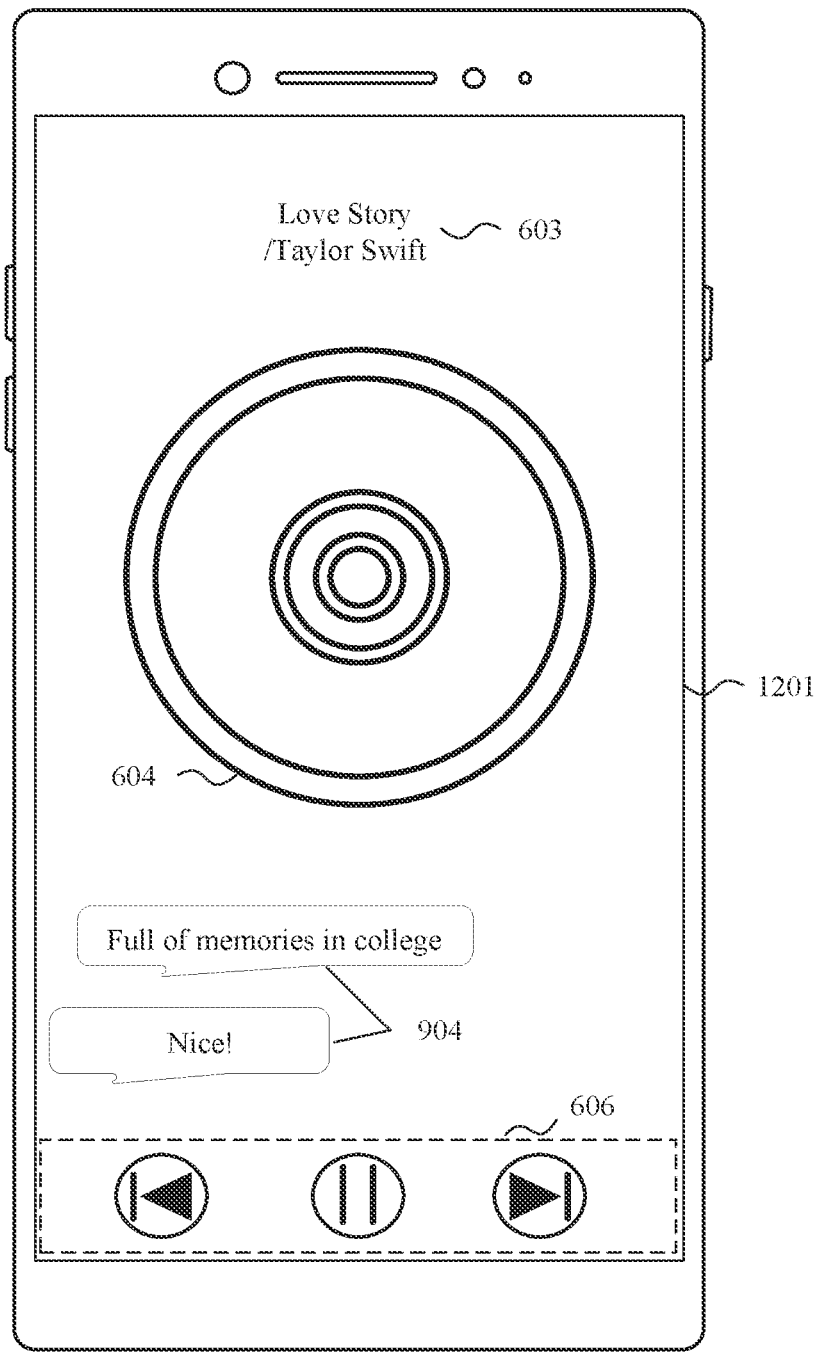
FIG. 12 is a schematic diagram 9 of an application scenario of a screen mirroring display method according to an embodiment of this application.

The view tree 1101 is still used as an example. After determining the view tree 1101 of the current screen mirroring interface, the mobile phone 500 may sequentially invoke drawing instructions of the controls in the view tree 1101 based on a hierarchy and an order of the controls in the view tree 1101, to draw the controls. When specifically drawing each control, the mobile phone 500 may execute, based on a display location that is of the control in the screen mirroring interface and that is recorded in the configuration file 3, a corresponding drawing instruction at the display location to draw the control. Finally, as shown in FIG. 12, the mobile phone 500 may draw and display a screen mirroring interface 1201 based on the view tree 1101 and the configuration file 3. The screen mirroring interface 1201 not only includes first target controls such as the title bar 603, the album cover 604, and the control bar 606 in the playback interface 600, but also includes a second target control named the bullet-screen comment 904 in the playback interface 900.

In this way, in a screen mirroring process, a destination device can simultaneously display content in a plurality of source devices, so that the user can view, in one destination device, display content in the plurality of source devices without performing switching between the plurality of source devices, thereby improving a display effect and user experience of screen mirroring display between a plurality of devices.

In addition, in the screen mirroring process, a communication connection between the destination device and the source device may be dynamically added or deleted.

For example, after the user disables the screen mirroring function in the mobile phone 502, the mobile phone 502 may disconnect a communication connection (for example, a Wi-Fi connection) between the mobile phone 502 and the mobile phone 500 (namely, the destination device). Further, the mobile phone 500 does not receive the second UI message sent by the mobile phone 502, and does not display, in the screen mirroring interface, related content in the playback interface 900.

For another example, in a process in which the mobile phone 501 and the mobile phone 502 perform screen mirroring to the mobile phone 500, if a new source device (for example, a smart watch) is added, the smart watch may establish a communication connection to the mobile phone 500. When receiving the first UI message and the second UI message, the mobile phone 500 may further receive a third UI message from the smart watch. Further, the mobile phone 500 may rearrange each control in the screen mirroring interface based on a corresponding configuration file, so that the mobile phone 501, the mobile phone 502, and the smart watch can project display content in the mobile phone 501, the mobile phone 502, and the smart watch onto the mobile phone 500 for display.

The foregoing embodiment describes an example in which the playback interface 600 in the mobile phone 501 and the playback interface 900 in the mobile phone 502 are projected onto the mobile phone 500. It may be understood that a plurality of source devices may also simultaneously project different types of display interfaces onto a destination device for display.

For example, a mobile phone and a smart watch are source devices of current screen mirroring, and a smart television is a destination device of the current screen mirroring.

As shown in FIG. 13(*a*), the mobile phone 501 may display a lock screen 1301 after enabling the screen mirroring function as a first source device. The lock screen 1301 includes wallpaper 1302, and the wallpaper 1302 includes controls such as a status bar 1303, a text control 1304, a file control 1305, and a notification message 1306. The notification message 1306 further includes controls such as an application icon 1307, time 1308, and message content 1309.

For example, the mobile phone 501 may obtain a view tree of the lock screen 1301 and a drawing instruction and a drawing resource of each control in the view tree. In addition, the mobile phone 501 may further obtain a configuration file A corresponding to the lock screen 1301. The configuration file A records a case in which first target controls on which screen mirroring to the smart television needs to be performed in the lock screen 1301 are the icon 1307 and the message content 1309 in the notification message 1306. Further, the mobile phone 501 may generate, based on display locations that are of the first target controls recorded in the configuration file A and that exist after screen mirroring, a view tree 1310 corresponding to the lock screen 1301 after screen mirroring. As shown in FIG. 13(*b*), in the view tree 1310, both the icon 1307 and the message content 1309 are child nodes of a root node.

Further, the mobile phone 501 (namely, the first source device) may send a first UI message to the smart television (namely, the destination device). The first UI message includes the view tree 1310 and a drawing instruction and a drawing resource related to each control in the view tree 1310.

Figure 14A:
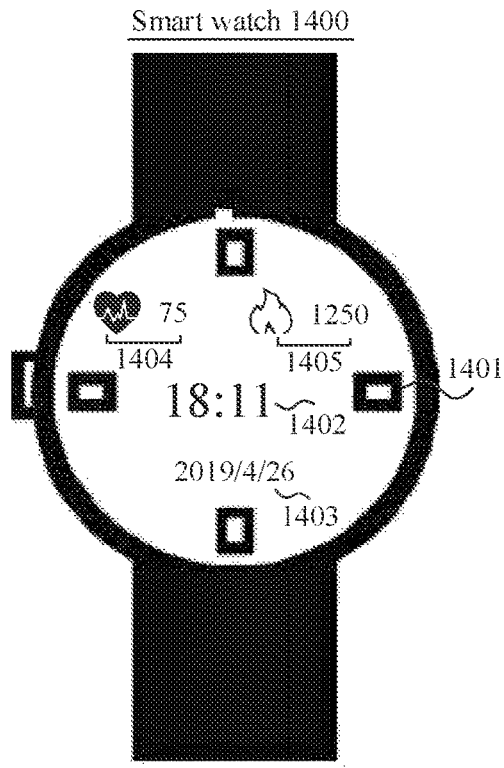
FIG. 14(a) and FIG. 14(b) are a schematic diagram 11 of an application scenario of a screen mirroring display method according to an embodiment of this application.
Figure 14B:
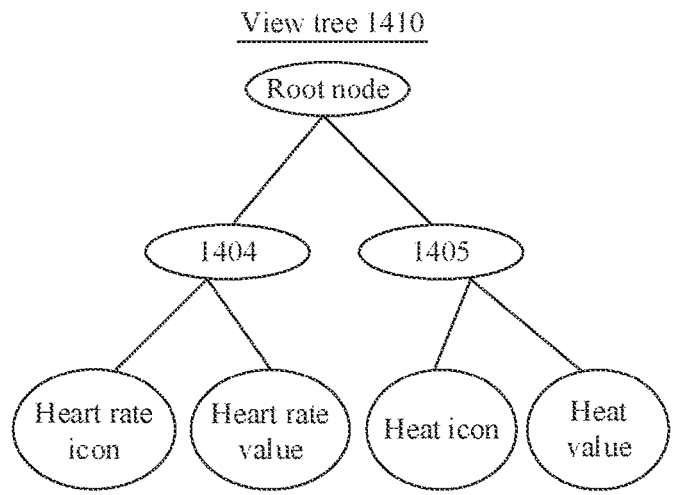

Similarly, as shown in FIG. 14(*a*), when the mobile phone 501 performs screen mirroring to the smart television, a smart watch 1400 may display a detection interface 1401 after enabling a screen mirroring function as a second source device. The detection interface 1401 includes time 1402, a date 1403, heart rate information 1404, and heat information 1405. The heart rate information 1404 further includes a heart rate icon and a heart rate value. The heat information 1405 further includes a heat icon and a heat value.

Therefore, the smart watch 1400 may obtain a view tree of the detection interface 1401 and a drawing instruction and a drawing resource of each control in the view tree. In addition, the smart watch 1400 may further obtain a configuration file B corresponding to the detection interface 1401. The configuration file B records a case in which second target controls on which screen mirroring to the smart television needs to be performed in the detection interface 1401 are the controls in the heart rate information 1404 and the heat information 1405. Further, the smart watch 1400 may generate, based on display locations that are of the second target controls recorded in the configuration file B and that exist after screen mirroring, a view tree 1410 corresponding to the detection interface 1401 after screen mirroring. As shown in FIG. 14(*b*), in the view tree 1410, both the heart rate information 1404 and the heat information 1405 are child nodes of a root node, child nodes of the heart rate information 1404 are the heart rate icon and the heart rate value, and child nodes of the heat information 1405 are the heat icon and the heat value.

Further, the smart watch 1400 (namely, the second source device) may send a second UI message to the smart television (namely, the destination device). The second UI message includes the view tree 1410 and a drawing instruction and a drawing resource related to each control in the view tree 1410.

After a smart television 1500 receives the first UI message and the second UI message, similar to the mobile phone 500, the smart television 1500 may split and recombine the view tree 1310 in the first UI message and the view tree 1410 in the second UI message, to generate a view tree corresponding to a current screen mirroring interface.

Figure 15A:
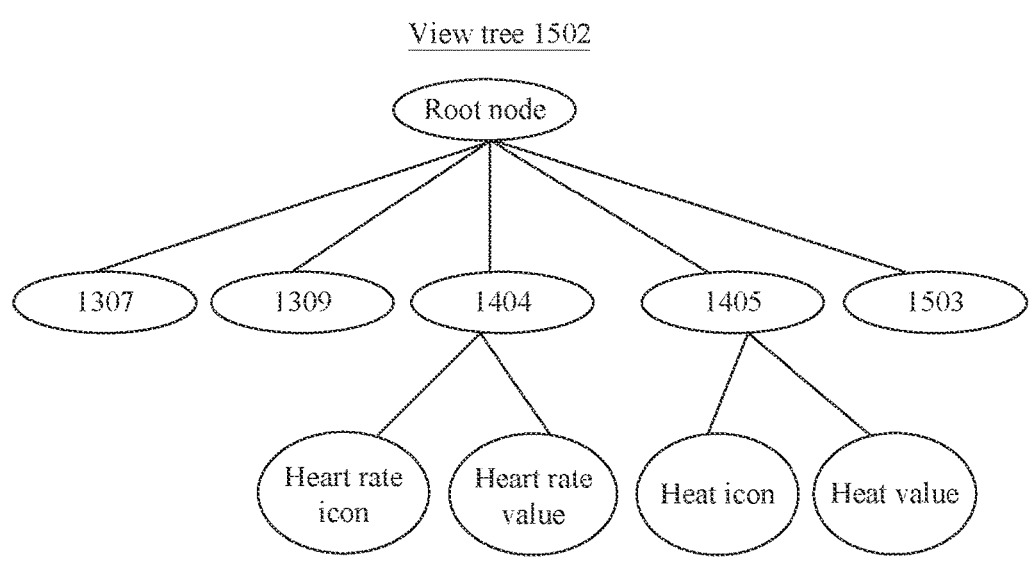
FIG. 15(a) and FIG. 15(b) are a schematic diagram 12 of an application scenario of a screen mirroring display method according to an embodiment of this application.
Figure 15B:
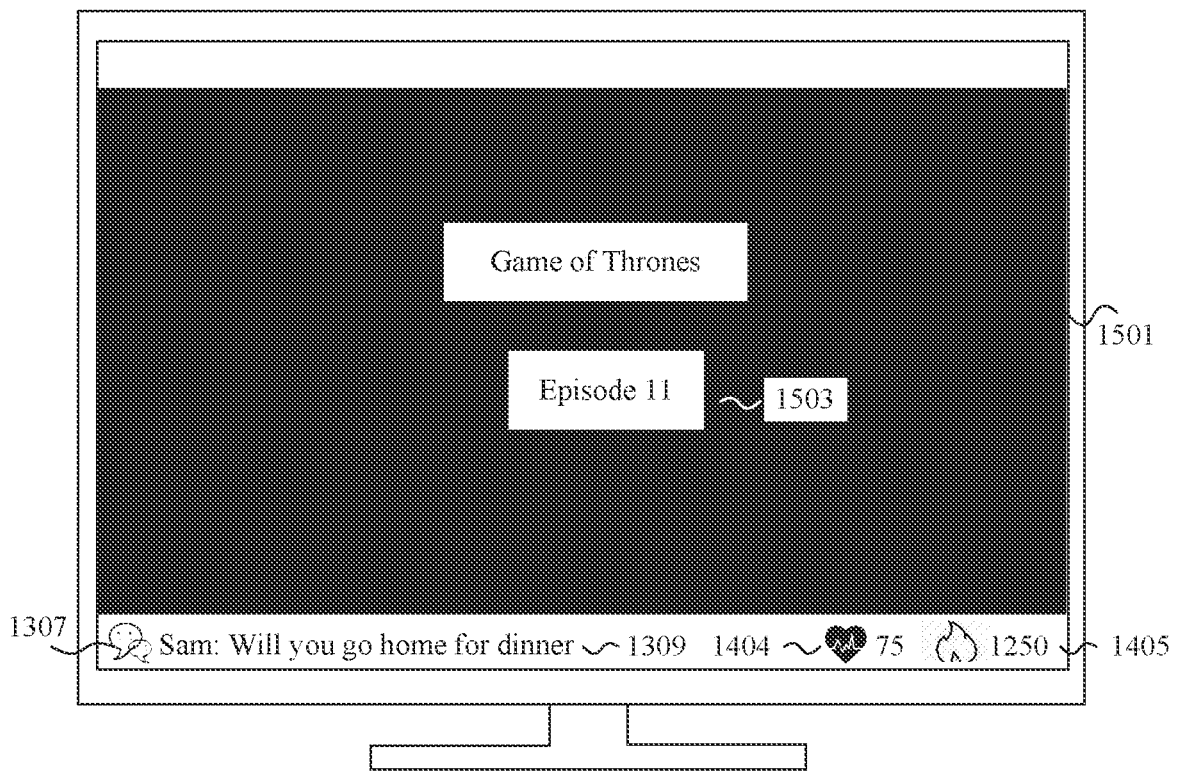

For example, as shown in FIG. 15(*a*), the smart television 1500 may generate a view tree 1502 corresponding to a current screen mirroring interface 1501. The view tree 1502 includes the controls in the view tree 1310, and further includes the controls in the view tree 1410. In addition, the view tree 1502 may further include one or more controls that are being displayed on the smart television 1500, for example, a video image 1503.

Further, the smart television 1500 may invoke a corresponding drawing instruction based on the view tree 1502, to draw each control on a display screen of the smart television 1500. Finally, as shown in FIG. 15(*b*), the smart television 1500 may draw and display the screen mirroring interface 1501 corresponding to the view tree 1502. The screen mirroring interface 1501 includes the video image 1503 that is being displayed on the smart television 1500, the icon 1307 and the message content 1309 in the notification message 1306 that are being displayed on the mobile phone 501, and the heart rate information 1404 and the heat information 1405 that are being displayed on the smart watch 1400.

In this way, in a screen mirroring process, a destination device can simultaneously display content in a plurality of source devices and display content in the destination device, so that a user can view, in one device, display content in a plurality of devices, thereby improving a display effect and user experience of screen mirroring display between a plurality of devices.

It should be noted that the foregoing embodiment illustrates an application scenario in which display content in a plurality of source devices is projected onto a same destination device. It may be understood that the foregoing screen mirroring display method may be further applied to another scenario, and this is not limited in this embodiment of this application.

Figure 16:
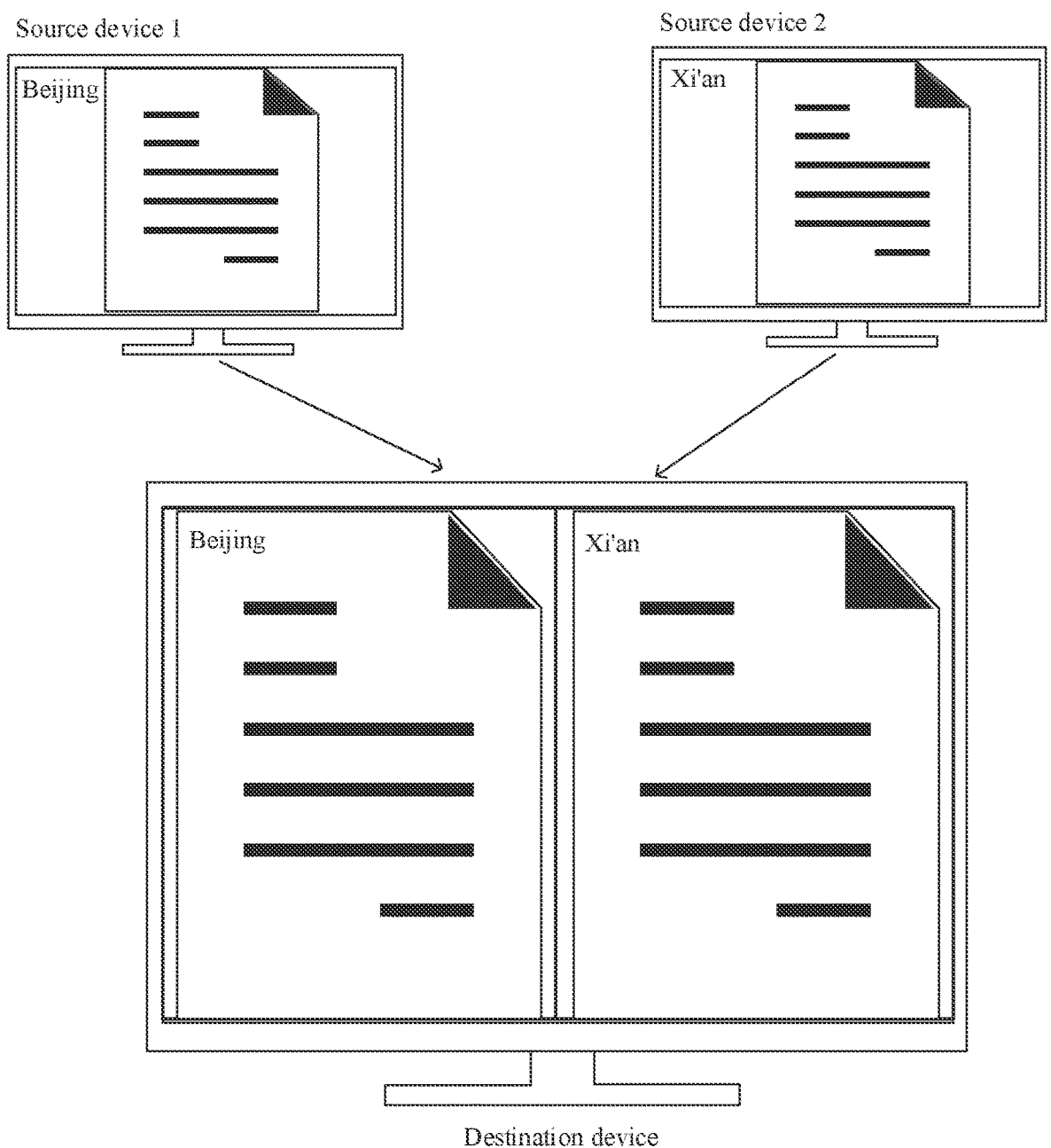
FIG. 16 is a schematic diagram 13 of an application scenario of a screen mirroring display method according to an embodiment of this application.

For example, as shown in FIG. 16, when a video conference is convened, an electronic device in a conference site may be used as a destination device, and electronic devices in other conference sites may be used as source devices. Each source device may send, according to the foregoing method, display content that needs to be projected onto the destination device to the destination device in a form of a UI message. Further, the destination device may display, on a display screen of the destination device according to the foregoing method, the display current currently projected by each source device. Certainly, the destination device may further display display content in the destination device on the display screen of the destination device.

For another example, a student may install a teaching assistant APP in a mobile phone or a computer or a tablet computer of the student. When the student uses the teaching assistant APP to answer a question, the electronic device of the student may be used as a source device to project, for display, display content of an answer area onto a mobile phone or a computer or a tablet computer used by a teacher. In this way, the teacher can preview answering processes of a plurality of students in respective answer areas in real time, and learn of answering ideas of the students in a timely manner, so that a teaching effect of the teaching assistant APP is improved.

An embodiment of this application discloses an electronic device, including a processor and a memory, an input device, an output device, and a communication module that are connected to the processor. The input device and the output device may be integrated into one device. For example, a touch sensor may be used as the input device, a display screen may be used as the output device, and the touch sensor and the display screen are integrated into a touchscreen.

Figure 17:
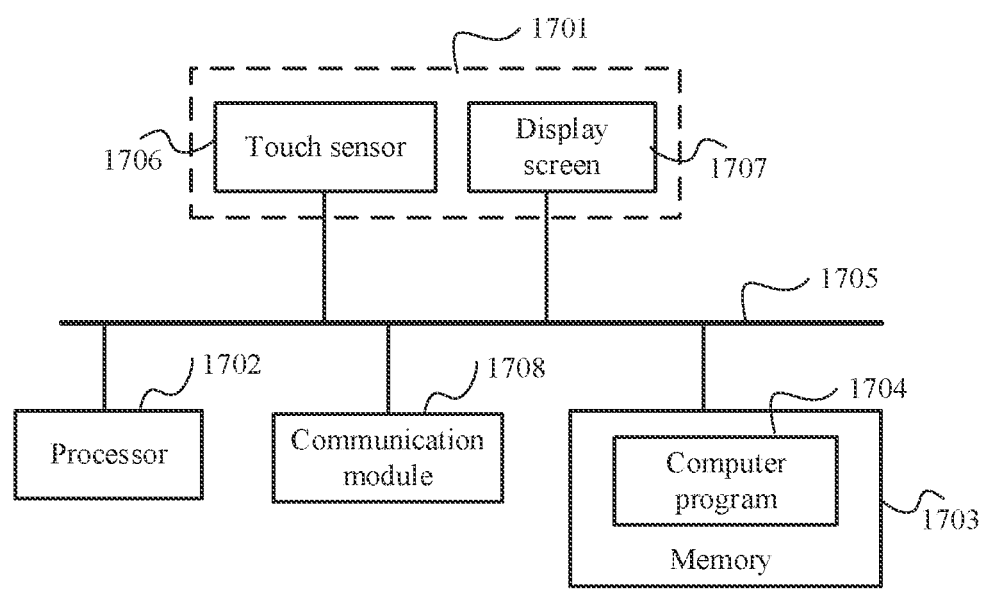
FIG. 17 is a schematic structural diagram 2 of an electronic device according to an embodiment of this application.

In this case, as shown in FIG. 17, the electronic device may include: a touchscreen 1701, where the touchscreen 1701 includes a touch sensor 1706 and a display screen 1707; one or more processors 1702; a memory 1703; a communication module 1708; one or more applications (not shown); and one or more computer programs 1704. The components may be connected through one or more communication buses 1705. The one or more computer programs 1704 are stored in the memory 1703 and configured to be executed by the one or more processors 1702. The one or more computer programs 1704 include instructions, and the instructions may be used to perform the steps in the foregoing embodiments. All content related to each step in the foregoing method embodiments may be cited in function descriptions of a corresponding entity component. Details are not described herein again.

For example, the processor 1702 may be specifically the processor 110 shown in FIG. 2, the memory 1703 may be specifically the internal memory 121 and/or the external memory 120 shown in FIG. 2, the display screen 1707 may be specifically the display screen 194 shown in FIG. 2, the touch sensor 1706 may be specifically the touch sensor in the sensor module 180 shown in FIG. 2, and the communication module 1708 may be specifically the mobile communication module 150 and/or the wireless communication module 160 shown in FIG. 2. This is not limited in this embodiment of this application.

The foregoing descriptions about implementations allow a person skilled in the art to understand that, for a purpose of convenient and brief description, division of the foregoing function modules is used as an example for illustration. In an actual application, the foregoing functions may be allocated to different modules and implemented based on a requirement, in other words, an inner structure of an apparatus is divided into different function modules to implement all or some of the functions described above. For a detailed working process of the foregoing system, apparatus, and unit, refer to a corresponding process in the foregoing method embodiments. Details are not described herein again.

Functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code such as a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A method comprising:
  receiving, from a first source device, a first message-comprising:
    a first drawing instruction instructing to draw one or more first target controls, wherein each of the one or more first target controls is a control in a first interface displayed by the first source device; and
    first view information comprising a first layer order of the one or more first target controls in a screen mirroring interface;
  receiving, from a second source device, a second message comprising:
    a second drawing instruction instructing to draw one or more second target controls, wherein each of the one or more second target controls is a control in a second interface displayed by the second source device; and
    second view information comprising a second layer order of the one or more second target controls in the screen mirroring interface;
  generating, based on the first view information and the second view information, third view information comprising the first layer order and the second layer order in the screen mirroring interface; and executing the first drawing instruction and the second drawing instruction based on the third view information to draw the screen mirroring interface, wherein the screen monitoring interface comprises the one or more first target controls and the one or more second target controls.

2. The method of claim 1, wherein before executing the first drawing instruction and the second drawing instruction, the method further comprises:
obtaining a configuration file corresponding to both the first interface and the second interface, wherein the configuration file records a first display location of each of the one or more first target controls in the screen mirroring interface and a second display location of each of the one or more second target controls in the screen mirroring interface; and
splitting and recombining, based on the configuration file, the one or more first target controls in the first view information and the one or more second target controls in the second view information to obtain the third view information.

3. The method of claim 2, further comprising:
executing the first drawing instruction at the first display location based on the first layer order in the third view information to draw the one or more first target controls; and
executing the second drawing instruction at the second display location based on the second layer order in the third view information to draw the one or more second target controls.

4. The method of claim 1, wherein before executing the first drawing instruction and the second drawing instruction, the method further comprises:
obtaining a first configuration file corresponding to the first interface, wherein the first configuration file records a first display location of each of the one or more first target controls in the screen mirroring interface;
obtaining a second configuration file corresponding to the second interface, wherein the second configuration file records a second display location of each of the one or more second target controls in the screen mirroring interface; and
splitting and recombining, based on the first configuration file and the second configuration file, the one or more first target controls in the first view information and the one or more second target controls in the second view information to obtain the third view information.

5. The method of claim 4, further comprising:
executing the first drawing instruction at the first display location based on the first layer order in the third view information to draw the one or more first target controls; and
executing the second drawing instruction at the second display location based on the second layer order in the third view information to draw the one or more second target controls.

6. The method of claim 1, wherein first display locations of the one or more first target controls in the first interface and the screen mirroring interface are the same, and wherein second display locations of the one or more second target controls in the second interface and the screen mirroring interface are the same.

7. The method of claim 1, wherein before receiving the first message, the method further comprises displaying a third interface, and wherein the screen mirroring interface further comprises one or more third target controls in the third interface.

8. An electronic device comprising:
one or more processors; and
a memory configured to store instructions, wherein when executed by the one or more processors, the instructions cause the electronic device to:
receive, from a first source device, a first message comprising:
a first drawing instruction instructing to draw one or more first target controls, wherein each of the one or more first target controls is a control in a first interface displayed by the first source device; and
first view information comprising a first layer order of the one or more first target controls in the screen mirroring interface;
receive, from a second source device, a second message comprising:
a second drawing instruction instructing to draw one or more second target controls, wherein each of the one or more second target control is a control in a second interface displayed by the second source device; and
second view information comprising a second layer order of the one or more second target controls in the screen mirroring interface;
generate, based on the first view information and the second view information, third view information comprising the first layer order and the second layer order in the screen mirroring interface; and
execute the first drawing instruction and the second drawing instruction based on the third view information to draw the screen mirroring interface, wherein the screen mirroring interface comprises the one or more first target controls and the one or more second target controls.

9. The electronic device of claim 8, wherein before executing the first drawing instruction and the second drawing instruction, when executed by the one or more processors, the instructions further cause the electronic device to:
obtain a configuration file corresponding to both the first interface and the second interface, wherein the configuration file records a first display location of each of the one or more first target controls in the screen mirroring interface and a second display location of each of the one or more second target controls in the screen mirroring interface; and
split and recombine, based on the configuration file, the one or more first target controls in the first view information and the one or more second target controls in the second view information to obtain the third view information.

10. The electronic device of claim 9, wherein when executed by the one or more processors, the instructions further cause the electronic device to:
execute the first drawing instruction at the first display location based on the first layer order in the third view information to draw the one or more first target controls; and
execute the second drawing instruction at the second display location based on the second layer order in the third view information to draw the second target controls.

11. The electronic device of claim 8, wherein before executing the first drawing instruction and the second drawing instruction, when executed by the one or more processors, the instructions further cause the electronic device to:

obtain a first configuration file corresponding to the first interface, wherein the first configuration file records a first display location of each of the one or more first target controls in the screen mirroring interface;

obtain a second configuration file corresponding to the second interface, wherein the second configuration file records a second display location of each of the one or more second target controls in the screen mirroring interface; and split and recombine, based on the first configuration file and the second configuration file, the one or more first target controls in the first view information and the one or more second target controls in the second view information to obtain the third view information.

12. The electronic device of claim 11, wherein when executed by the one or more processors, the instructions further cause the electronic device to:

execute the first drawing instruction at the first display location based on the first layer order in the third view information to draw the one or more first target controls; and execute the second drawing instruction at the second display location based on the second layer order in the third view information to draw the one or more second target controls.

13. The electronic device of claim 8, wherein first display locations of the one or more first target controls in the first interface and the screen mirroring interface are the same, and wherein second display locations of the one or more second target controls in the second interface and the screen mirroring interface are the same.

14. The electronic device of claim 8, wherein before receiving the first message, when executed by the one or more processors, the instructions further cause the electronic device to display a third interface, and wherein the screen mirroring interface further comprises one or more third target controls in the third interface.

15. A computer program product comprising computer-executable instructions that are stored on a non-transitory computer-readable medium and that, when executed by one or more processors, cause an electronic device to:

receive, from a first source device, a first message comprising:
 a first drawing instruction instructing to draw one or more first target controls, wherein each of the one or more first target controls is a control in a first interface displayed by the first source device; and
 first view information comprising a first layer order of the one or more first target controls in the screen mirroring interface;

receive, from a second source device, a second message comprising:
 a second drawing instruction instructing to draw one or more second target controls, wherein each of the one or more second target controls is a control in a second interface displayed by the second source device; and
 second view information comprising a second layer order of the one or more second target controls in the screen mirroring interface; and execute the first drawing instruction and the second drawing instruction based on the third view information to draw the screen mirroring interface, wherein the screen mirroring interface comprises the one or more first target controls and the one or more second target controls.

16. The computer program product of claim 15, wherein before executing the first drawing instruction and the second drawing instruction, the computer-executable instructions further cause the electronic device to:

obtain a configuration file corresponding to both the first interface and the second interface, wherein the configuration file records a first display location of each of the one or more first target controls in the screen mirroring interface and a second display location of each of the one or more second target control in the screen mirroring interface; and split and recombine, based on the configuration file, the one or more first target controls in the first view information and the one or more second target controls in the second view information to obtain the third view information.

17. The computer program product of claim 16, wherein when executed by the one or more processors, the computer-executable instructions further cause the electronic device to:

execute the first drawing instruction at the first display location based on the first layer order in the third view information to draw the one or more first target controls; and execute the second drawing instruction at the second display location based on the second layer order in the third view information to draw the second target controls.

18. The computer program product of claim 15, wherein before executing the first drawing instruction and the second drawing instruction, the computer-executable instructions further cause the electronic device to:

obtain a first configuration file corresponding to the first interface, wherein the first configuration file records a first display location of each of the one or more first target controls in the screen mirroring interface;

obtain a second configuration file corresponding to the second interface, wherein the second configuration file records a second display location of each of the one or more second target controls in the screen mirroring interface; and split and recombine, based on the first configuration file and the second configuration file, the one or more first target controls in the first view information and the one or more second target controls in the second view information to obtain the third view information.

19. The computer program product of claim 18, wherein when executed by the one or more processors, the computer-executable instructions further cause the electronic device to:

execute the first drawing instruction at the first display location based on the first layer order in the third view information to draw the one or more first target controls; and execute the second drawing instruction at the second display location based on the second layer order in the third view information to draw the one or more second target controls.

20. The computer program product of claim 15, wherein first display locations of the one or more first target controls in the first interface and the screen mirroring interface are the same, and wherein second display locations of the one or more second target controls in the second interface and the screen mirroring interface are the same.

* * * * *